US012801511B2

(12) United States Patent
Rao et al.

(10) Patent No.: US 12,801,511 B2
(45) Date of Patent: Nov. 17, 2026

(54) BMC SDK PLUGIN PROVISIONING SYSTEM

(71) Applicant: Dell Products L.P., Round Rock, TX (US)

(72) Inventors: Balaji Bapu Gururaja Rao, Austin, TX (US); Rui An, Austin, TX (US); Deepaganesh Paulraj, Bangalore (IN); Brahmananda Reddy Thodati, Round Rock, TX (US); Shivabasava Karibasappa Komaranalli, Round Rock, TX (US); Rama Rao Bisa, Bangalore (IN)

(73) Assignee: Dell Products L.P., Round Rock, TX (US)

(*) Notice: Subject to any disclaimer, the term of this patent is extended or adjusted under 35 U.S.C. 154(b) by 306 days.

(21) Appl. No.: 18/660,387

(22) Filed: May 10, 2024

(65) Prior Publication Data

US 2025/0348413 A1 Nov. 13, 2025

(51) Int. Cl.
*G06F 11/362* (2025.01)
*G06F 8/65* (2018.01)

(52) U.S. Cl.
CPC .............. *G06F 11/366* (2013.01); *G06F 8/65* (2013.01)

(58) Field of Classification Search
CPC ....... G06F 11/366; G06F 8/65; G06F 9/44526
USPC .......................................................... 717/124
See application file for complete search history.

(56) References Cited

U.S. PATENT DOCUMENTS

| | | | | |
|---|---|---|---|---|
| 8,417,774 | B2 * | 4/2013 | Flynn | G06F 3/0688 714/E11.154 |
| 10,333,771 | B2 | 6/2019 | Chou et al. | |
| 12,380,051 | B1 * | 8/2025 | Bhatia | G06F 13/4282 |
| 12,423,204 | B2 * | 9/2025 | Jesurajan Marystella | G06F 11/3058 |
| 2008/0313312 | A1 * | 12/2008 | Flynn | G06F 1/183 709/224 |
| 2015/0052596 | A1 * | 2/2015 | Ayanam | H04W 4/38 726/8 |
| 2020/0218811 | A1 * | 7/2020 | Rangel-Martinez | G06F 21/44 |
| 2022/0114027 | A1 * | 4/2022 | Puthillathe | G06F 13/387 |

OTHER PUBLICATIONS

Kim, Young-Ho, Cbang-Won Ahn, and Sung-In Jung. "Design of platform management provider based on HPI manageability block using CIM/WBEM standards." The 7th International Conference on Advanced Communication Technology, 2005, ICACT 2005. vol. 2. IEEE, 2005. pp. 927-932. (Year: 2005).*

(Continued)

*Primary Examiner* — Satish Rampuria
(74) *Attorney, Agent, or Firm* — Joseph Mencher

(57) ABSTRACT

A Baseboard Management Controller (BMC) Software Development Kit (SDK) plugin provisioning system includes a chassis housing a computing component and a BMC device that is coupled to the computing component. The BMC device identifies firmware that will be utilized by the computing component, and determines that a Software Development Kit (SDK) plugin, which is not currently configured for use by the BMC device, is required to interact with the firmware. In response, the BMC device accesses the SDK plugin, configures the SDK plugin for use by the BMC device, and uses the SDK plugin to interact with the firmware.

20 Claims, 28 Drawing Sheets

(56) References Cited

OTHER PUBLICATIONS

Kim, Jaeseop, et al. "An efficient profiling tool for baseboard management controllers." Proceedings of the 38th ACM/SIGAPP Symposium on Applied Computing. 2023.pp. 1318-1324. (Year: 2013).*
Bruno, Andrew E., et al. "Grendel: Bare metal provisioning system for high performance computing." Practice and Experience in Advanced Research Computing 2020: Catch the Wave. 2020. pp. 13-18. (Year: 2020).*
Cox, Billy, et al. "Openstack and Intel Technology Best Practice." Intel Technology Journal 16.4 (2012). pp. 78-91 ( Year: 2012).*
Ali, Ghazanfar, et al. "Redfish-nagios: A scalable out-of-band data center monitoring framework based on redfish telemetry model." fifth international workshop on systems and network telemetry and analytics. 2022. pp. 3-11 (Year: 2022).*

* cited by examiner

400

BMC SDK PLUGIN PROVISIONING SYSTEM

BACKGROUND

The present disclosure relates generally to information handling systems, and more particularly to providing Software Development Kit (SDK) plugins on Baseboard Management Controller (BMC) devices in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and other computing devices known in the art, are sometimes provided with Baseboard Management Controller (BMC) devices such as the Integrated DELL® Remote Access Controller (iDRAC®) available from DELL® Inc. of Round Rock, Texas, United States, which one of skill in the art in possession of the present disclosure will appreciate provides an out-of-band management platform that includes mostly separate resources from the server device that are configured to provide a browser-based interface or Command Line Interface (CLI) for managing and monitoring server components.

For example, BMC devices such as the iDRAC® discussed above include an embedded diagnostics Unified Extensible Firmware Interface (UEFI) application that operates in a Basic Input/Output System (BIOS) environment of the server device and that is configured to interact with diagnostic tools on the server components. However, due to the varying and diverse nature of server components having vendor-specific architectures, some diagnostic operations may only be available using vendor diagnostic tools that are provided by the vendors of such server components and that may be configured to operate in a variety of execution environments (e.g., a UEFI, BMC, operating system, etc.), which can raise issues. For example, when conventional BMC devices are initially provided in their server device, they are statically configured (e.g., provided with Software Development Kit (SDK) plugin(s)) to interact with particular server component firmware provided for the server components that are included in that server device, and following the provisioning of that server device to a user, those BMC devices will be unable to interact with vendor diagnostic tools provided in server component firmware that is subsequently developed or otherwise provided for those server components.

Accordingly, it would be desirable to provide a BMC/firmware interaction system that addresses the issues discussed above.

SUMMARY

According to one embodiment, an Information Handling System (IHS) includes a Baseboard Management Controller (BMC) processing system; and a BMC memory system that is coupled to the BMC processing system and that includes instructions that, when executed by the BMC processing system, cause the BMC processing system to provide a BMC engine that is configured to: identify firmware that will be utilized by a computing component that is coupled to the processing system; determine that a Software Development Kit (SDK) plugin, which is not currently configured for use by the BMC engine, is required to interact with the firmware; access, in response to determining that the SDK plugin is required to interact with the firmware, the SDK plugin; configure the SDK plugin for use by the BMC engine; and use the SDK plugin to interact with the firmware.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
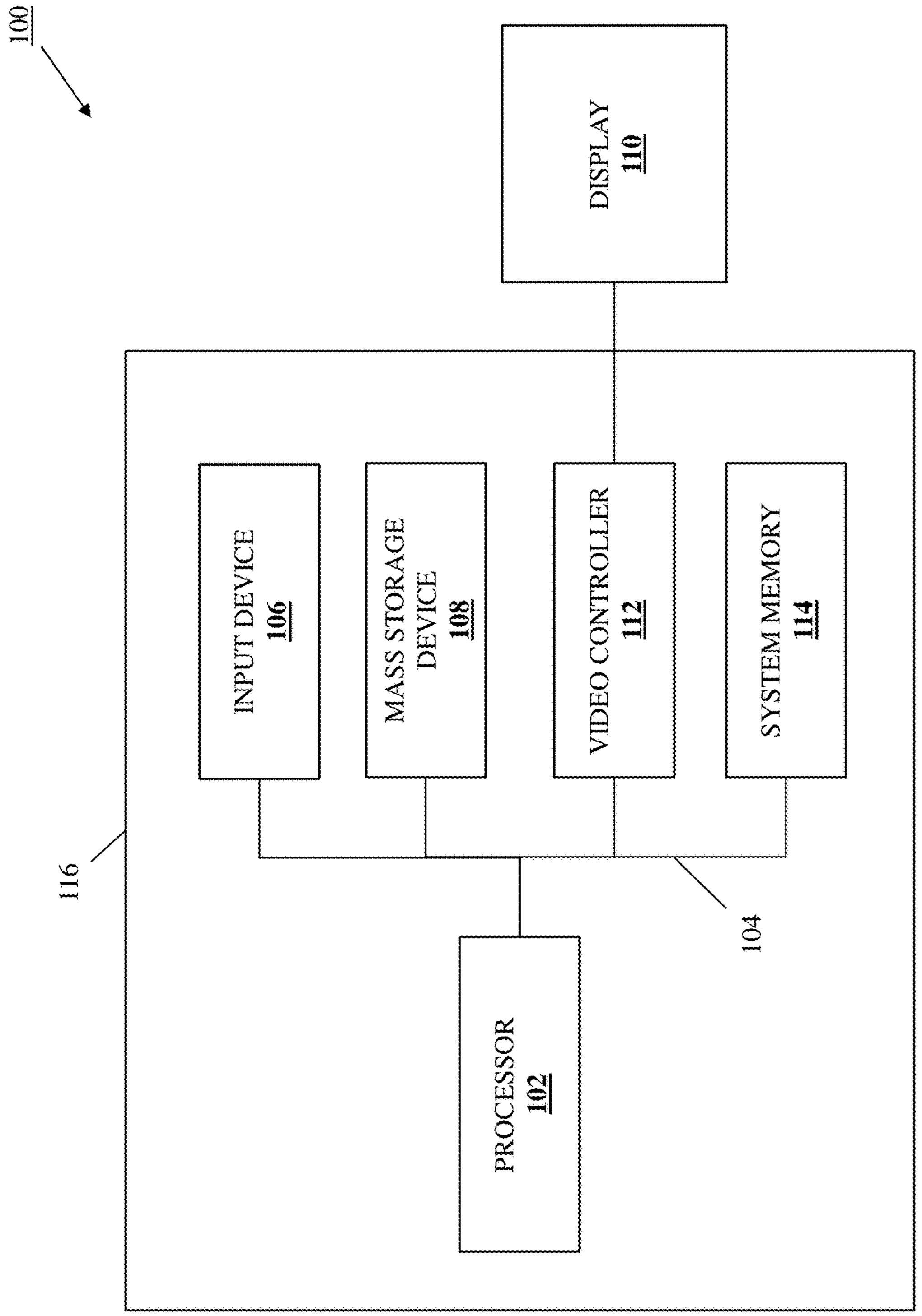
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
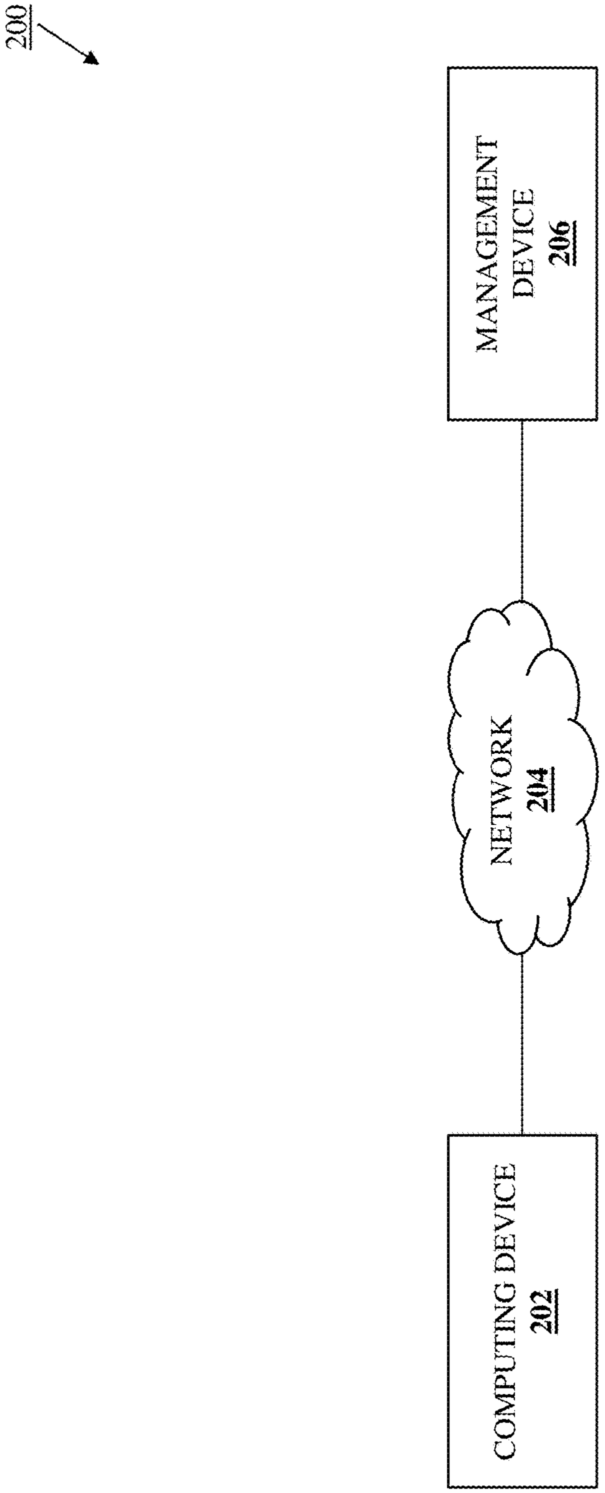
FIG. 2 is a schematic view illustrating an embodiment of a networked system that may provide the BMC SDK plugin provisioning system of the present disclosure.

Referring now to FIG. 2, an embodiment of a networked system 200 is illustrated that may provide the BMC SDK plugin provisioning system of the present disclosure. In the illustrated embodiment, the networked system 200 includes a computing device 202. In an embodiment, the computing device 202 may be provided by the IHS 100 discussed above with reference to FIG. 1, and/or may include some or all of the components of the IHS 100, and in the specific examples below is illustrated and described as being provided by a server device. However, while illustrated and discussed as being provided by a server device, one of skill in the art in possession of the present disclosure will recognize that computing devices provided in the networked system 200 may include any devices that may be configured to operate similarly as the computing device 202 discussed below.

The computing device 202 may be coupled to a network 204 that may be provided by a Local Area Network (LAN), the Internet, combinations thereof, and/or any other network that would be apparent to one of skill in the art in possession of the present disclosure. Furthermore, a management device 206 may be coupled to the network 204. In an embodiment, the management device 206 may be provided by the IHS 100 discussed above with reference to FIG. 1, and/or may include some or all of the components of the IHS 100, and may be provided by a desktop computing device, a laptop/notebook computing device, a tablet computing device, a mobile phone, and/or any other management device that would be apparent to one of skill in the art in possession of the present disclosure. However, while illustrated and discussed as being provided by particular management devices, one of skill in the art in possession of the present disclosure will recognize that management devices provided in the networked system 200 may include any devices that may be configured to operate similarly as the management device 206 discussed below. Furthermore, while a specific networked system 200 has been illustrated and described, one of skill in the art in possession of the present disclosure will recognize that the networked system of the present disclosure may include a variety of components and component configurations while remaining within the scope of the present disclosure as well.

Figure 3:
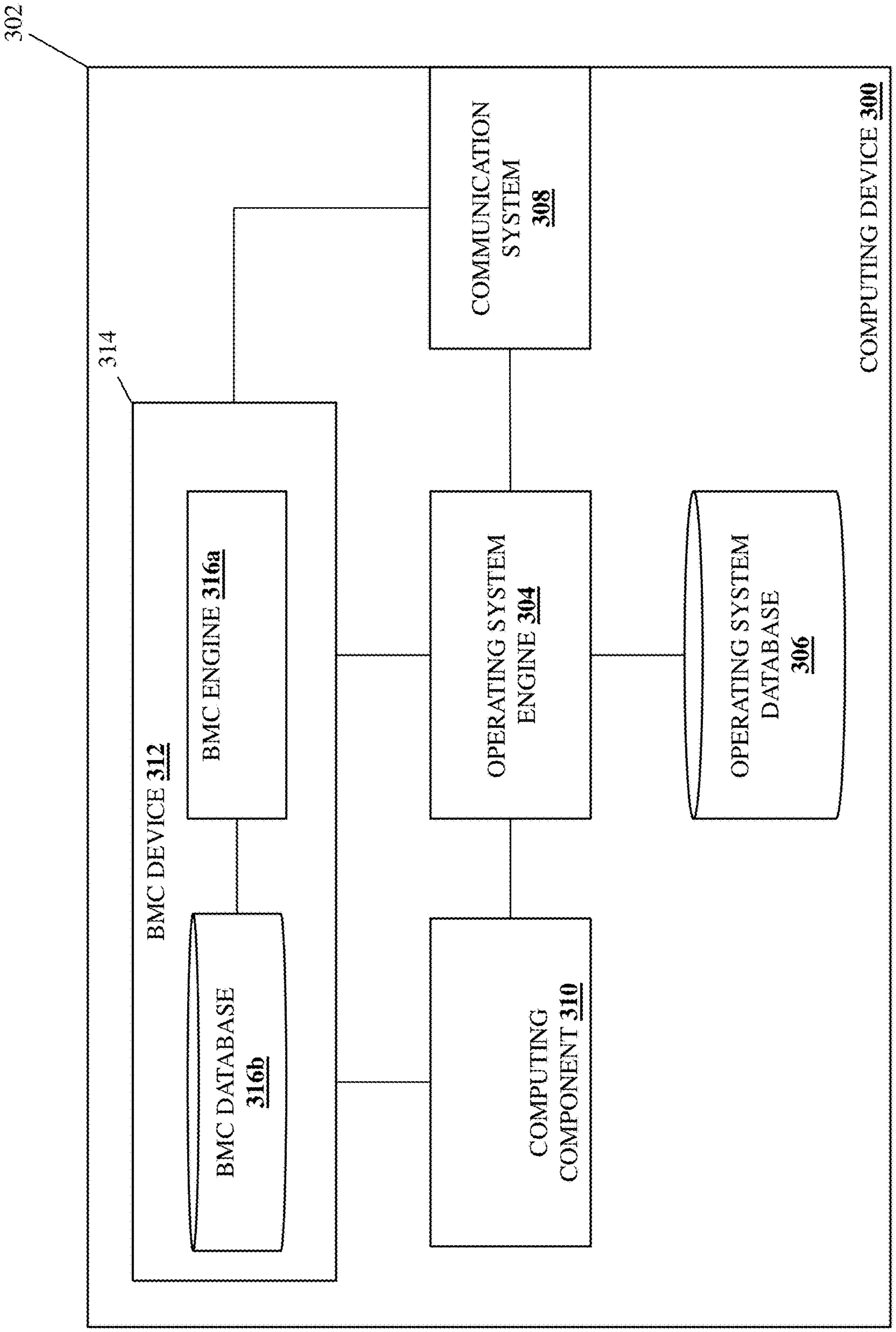
FIG. 3 is a schematic view illustrating an embodiment of a computing device that may be included in the networked system of FIG. 2 and that may provide the BMC SDK plugin provisioning system of the present disclosure.

Referring now to FIG. 3, an embodiment of a computing device 300 is illustrated that may provide the computing device 202 discussed above with reference to FIG. 2. As such, the computing device 300 may be provided by the IHS 100 discussed above with reference to FIG. 1 and/or may include some or all of the components of the IHS 100, and in specific example may be provided by a server device. However, while illustrated and discussed as being provided by a server device, one of skill in the art in possession of the present disclosure will recognize that the functionality of the computing device 300 discussed below may be provided by other devices that are configured to operate similarly as the computing device 300 discussed below.

In the illustrated embodiment, the computing device 300 includes a chassis 302 that houses the components of the computing device 300, only some of which are illustrated and described below. For example, the chassis 302 may house a primary processing system (not illustrated, but which may include the processor 102 discussed above with reference to FIG. 1 such as, for example, a Central Processing Unit (CPU)) and a primary memory system (not illustrated, but which may include the memory 114 discussed above with reference to FIG. 1) that is coupled to the primary processing system and that includes instructions that, when executed by the primary processing system, cause the primary processing system to provide an operating system engine 304 that is configured to provide an operating system and/or otherwise perform the functionality of the operating system engines and/or computing devices discussed below. As will be appreciated by one of skill in the art in possession of the present disclosure, the illustration and discussion of the operating system engine that provides an operating system as described above is included herein as an example of the primary processing functionality available from the primary processing system and primary memory system in the computing device, but one of skill in the art in possession of the present disclosure will appreciate how other primary processing system functionality will fall within the scope of the present disclosure as well.

The chassis 302 may also house a primary storage system (not illustrated, but which may include the storage 108 discussed above with reference to FIG. 1) that is coupled to the operating system engine 304 (e.g., via a coupling between the primary storage system and the primary processing system) and that includes an operating system database 306 that is configured to store any of the information utilized by the operating system engine 304 discussed below. The chassis 302 may also house a communication system 308 that is coupled to the operating system engine 304 (e.g., via a coupling between the communication system 308 and the primary processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure.

The chassis 302 may also house a computing component 310 that is coupled to the operating system engine 304 (e.g., via a coupling between the computing component 310 and the primary processing system), and that may be provided by any of a variety of different computing components. For example, the computing component 310 described below may be provided by a Graphics Processing Unit such as, for example, an HGX H100 80GB 700W SXM5 GPU or an HGX A100 80GB 500W SXM4 GPU available from NVIDIA® Corporation of Santa Clara, California, United States; an Accelerator Processing Unit (APU) such as the INSTINCT™ MI300 Series APU available from AMD®, Inc. of Santa Clara, California, United States; a Data Processing Unit (DPU); and/or other computing components that would be apparent to one of skill in the art in possession of the present disclosure. Furthermore, while a single computing component is illustrated and described, one of skill in the art in possession of the present disclosure will appreciate how multiple computing components may be provided in the computing device 300 and may operate similarly as described below for the computing component 310 while remaining within the scope of the present disclosure as well. To provide a specific example, the functionality described below in association with the computing component 310 may be provided for an eight GPU subsystem included in a server device such as, for example, the POWEREDGE® XE9680 rack server available from DELL® Inc. of Round Rock, Texas, United States.

The chassis 302 may also house a BMC device 312 that is coupled to the operating system engine 304 (e.g., via a coupling between the BMC device 312 and the primary processing system) and the computing component 310, and that may be provided by the Integrated DELL® Remote Access Controller (iDRAC®) available from DELL(® Inc. of Round Rock, Texas, United States, as well as any other BMC device that would be apparent to one of skill in the art in possession of the present disclosure. As such, the BMC device 312 may provide an out-of-band management platform for the computing device 300 that includes mostly separate resources from the computing device 300 and provides a browser-based interface or Command Line Interface (CLI) for managing and monitoring components in the computing device 300.

As illustrated, the BMC device 312 includes a chassis (e.g., a circuit board) that supports the components of the BMC device 312, only some of which are illustrated and described below. For example, the chassis 314 may support a BMC processing system (not illustrated, but which may be similar to the processor 102 discussed above with reference to FIG. 1) and a BMC memory system (not illustrated, but which may be similar to the memory 114 discussed above with reference to FIG. 1) that is coupled to the BMC processing system and that includes instructions that, when executed by the BMC processing system, cause the BMC processing system to provide BMC engine **316*a* that is configured to perform the functionality of the BMC engines and/or BMC devices discussed below. As will be appreciated by one of skill in the art in possession of the present disclosure, the management engine may be configured to perform a variety of management functionality that is separate from the operating system and/or other primary processing functionality available from the primary processing system and primary memory system in the computing device 300**.

The chassis 314 may also house a BMC storage system (not illustrated, but which may include the storage 108 discussed above with reference to FIG. 1) that is coupled to the BMC engine **316*a* (e.g., via a coupling between the BMC storage system and the BMC processing system) and that includes an BMC database 316*b* that is configured to store any of the information utilized by the BMC engine 316***a* discussed below. However, while a specific computing device 300 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the BMC SDK plugin provisioning functionality discussed below, while remaining within the scope of the present disclosure as well.

Figure 4:
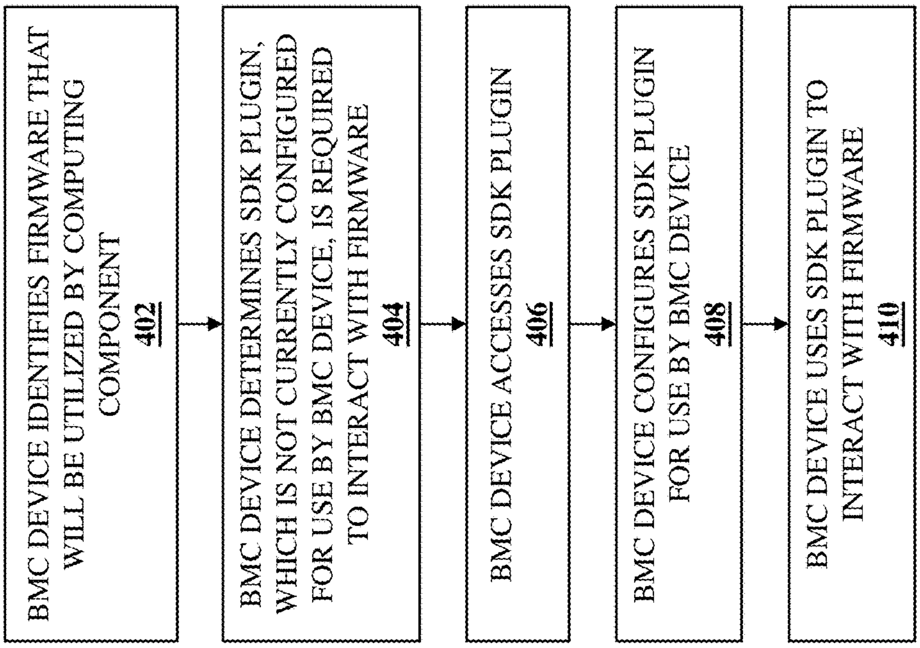
FIG. 4 is a flow chart illustrating an embodiment of a method for providing an SDK plugin in a BMC device.

Referring now to FIG. 4, an embodiment of a method 400 for providing a Software Development Kit (SDK) plugin in a Baseboard Management Controller (BMC) device is illustrated. As discussed below, the systems and methods of the present disclosure provide for the provisioning of an SDK plugin (e.g., a new SDK plugin, an SDK plugin update, etc.) on a BMC device when firmware (e.g., new firmware, a firmware update, etc.) is provided on a computing component. For example, the BMC SDK plugin provisioning system may include a chassis housing a computing component and a BMC device that is coupled to the computing component. The BMC device identifies firmware that will be utilized by the computing component, and determines that a Software Development Kit (SDK) plugin, which is not currently configured for use by the BMC device, is required to interact with the firmware. In response, the BMC device accesses the SDK plugin, configures the SDK plugin for use by the BMC device, and uses the SDK plugin to interact with the firmware. As such, a BMC device may be configured to interact with firmware provided for their computing components subsequent to the provisioning of their computing device (which includes that BMC device and those computing components) to a user.

As discussed in further detail below, some embodiments of the method 400 may include the computing device 300 that is initially provided to a user with the computing component 310 that does not include firmware with which the BMC engine 316*a* in the BMC device 312 must interact, and thus the BMC engine 316*a* may not be provided with an SDK plugin that is configured for use by the BMC engine 316*a* to interact with firmware on the computing component 310 prior to the method 400 (e.g., as illustrated in FIG. 3A). As such, some embodiments of the method 400 may provide for the development and provisioning of "new" firmware for a computing component in a computing device, as well as the provisioning of a "new" SDK plugin for a BMC device in that computing device to allow it to interact with that "new" firmware.

Figure 5:
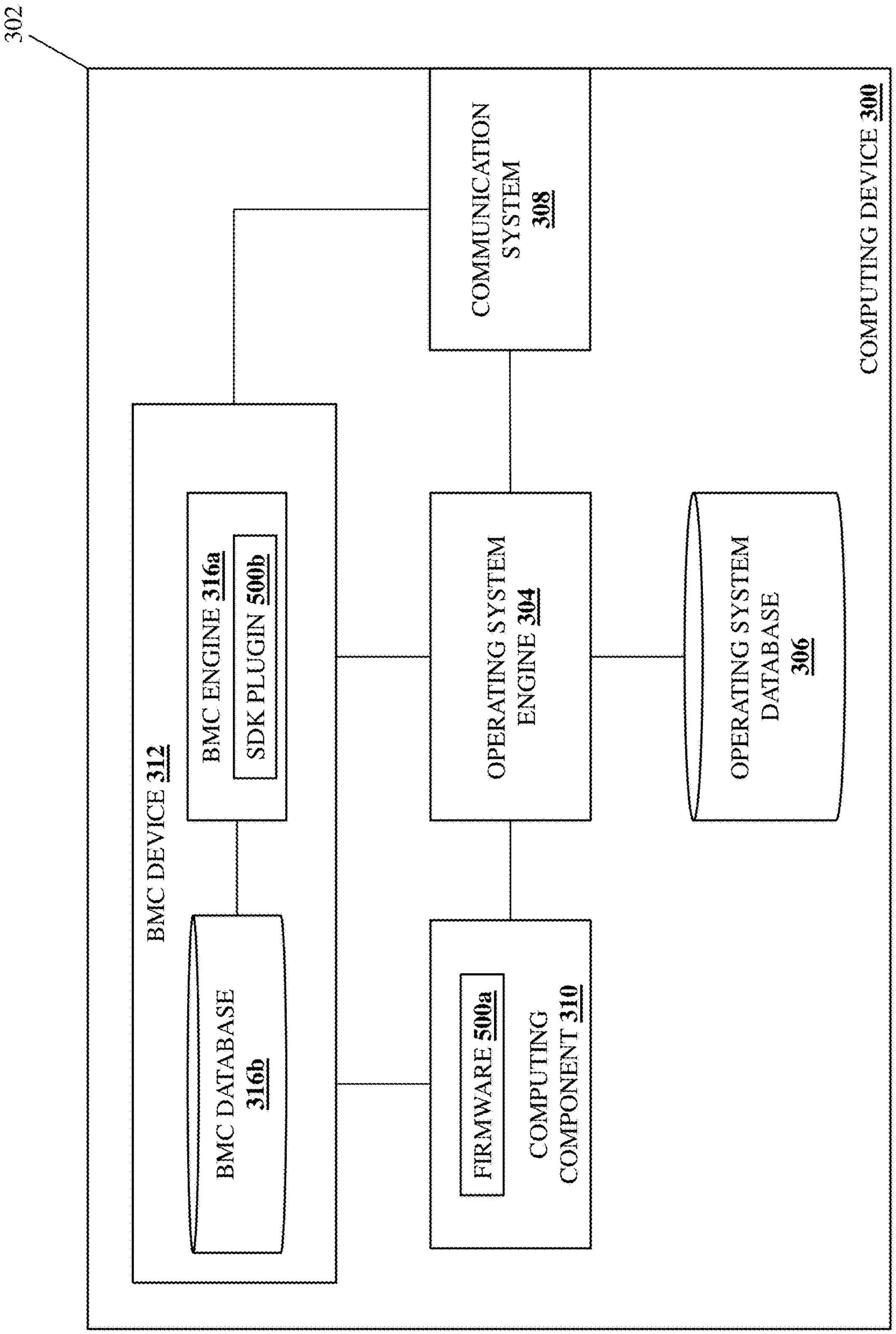
FIG. 5 is a schematic view illustrating an embodiment of the computing device of FIG. 3 operating during the method of FIG. 4.

However, as illustrated in FIG. 5, other embodiments of the method 400 may initially provide the computing device 300 to a user with the computing component 310 that includes "existing" firmware 500*a* with which the BMC engine 316*a* in the BMC device 312 must interact, and thus the BMC engine 316*a* may be provided with an "existing" SDK plugin 500*b* that is configured for use by the BMC engine 316*a* to interact with the "existing" firmware 500*a* on the computing component 310 prior to the method 400. As such, some embodiments of the method 400 may provide for the development and provisioning of a firmware "update" for a computing component in a computing device, as well as the provisioning of an SDK plugin "update" for a BMC device in that computing device to allow it to interact with that firmware "update". However, while two specific examples are provided, one of skill in the art in possession of the present disclosure will appreciate how the BMC SDK plugin provisioning system may be utilized in a variety of other scenarios while remaining within the scope of the present disclosure as well.

In some embodiments, prior to or during the method 400, the management device 206 may be provided with a "firmware package" (e.g., a DELL® Update Package (DUP) available from DELL® Inc. of Round Rock, Texas, United States) that may include a self-executable file in a standard package format that is configured to provide or update firmware on the computing component 310 in the computing device 202/300. For example, the firmware package may include firmware (e.g., provided in a "package.xml file" that is included in the firmware package) that was developed by a vendor of the computing component 310, which may include such firmware that is configured to provide vendor-provided diagnostic tool(s), margin tool(s) (e.g., tool(s) that "exercise" communication component functionality (e.g., re-timers)), other debug tool(s), optical disk images (e.g., ISO images) that provide a package for installing an operating system, and/or any other firmware that would be apparent to one of skill in the art in possession of the present disclosure. As described above, the firmware provided in the firmware package may provide "new" firmware for the computing component 310, or a firmware "update" for existing firmware that is currently provided on the computing component 310.

Furthermore, in some embodiments, the firmware package may also include an SDK plugin that is configured to be provided for the BMC engine 316*a* in the BMC device 312 to allow it to interact with the firmware in the firmware package, although as described below embodiments in which the firmware package includes only the firmware discussed above will fall within the scope of the present disclosure as well. In either situation, the firmware package may be secured by an entity providing the firmware package (e.g., a computing device manufacturer of the computing device 202/300 such as DELL® Inc. of Round Rock, Texas, United States) via a digital signature that provides a trusted digital certificate that one of skill in the art in possession of the present disclosure will appreciate may be used to attest to the authenticity of the firmware package.

Furthermore, in some embodiments and prior to or during the method 400 (e.g., during the manufacture of the computing device 202/300 in which the BMC device 312 is provided therein and prior to providing the computing device 202/300 to a user), the BMC engine 316*a* may be used to create a "placeholder"/"dummy" firmware inventory entry (e.g., a "placeholder"/"dummy" vendor-provided diagnostic tool inventory entry) in the BMC database 316*b*, which one of skill in the art in possession of the present disclosure will appreciate is a firmware provisioning technique for enabling the provisioning of the firmware on the computing component 310 as described below. However, while a specific example has been described, one of skill in the art in possession of the present disclosure will also appreciate how other techniques for enabling the provisioning of firmware on computing components will fall within the scope of the present disclosure as well.

Figure 6A:
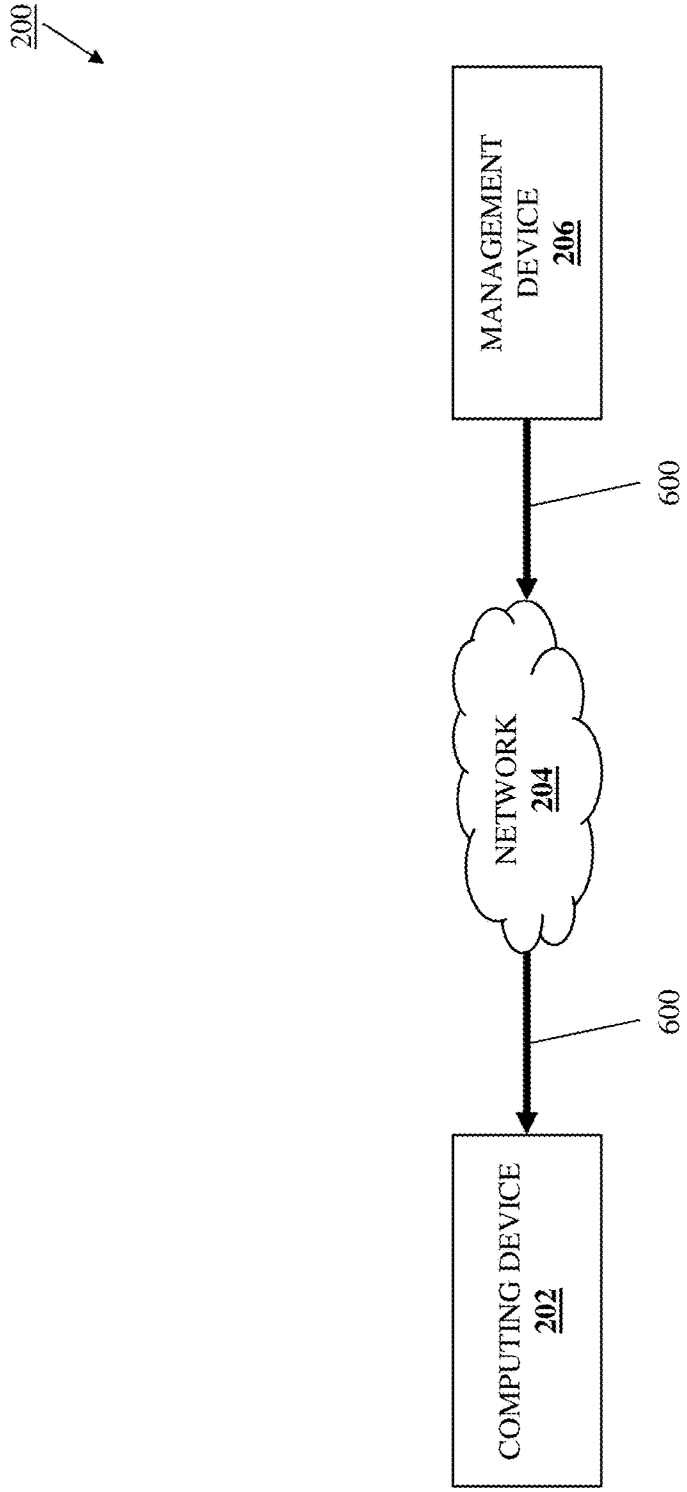
FIG. 6A is a schematic view illustrating an embodiment of the networked system of FIG. 2 operating during the method of FIG. 4.
Figure 6B:
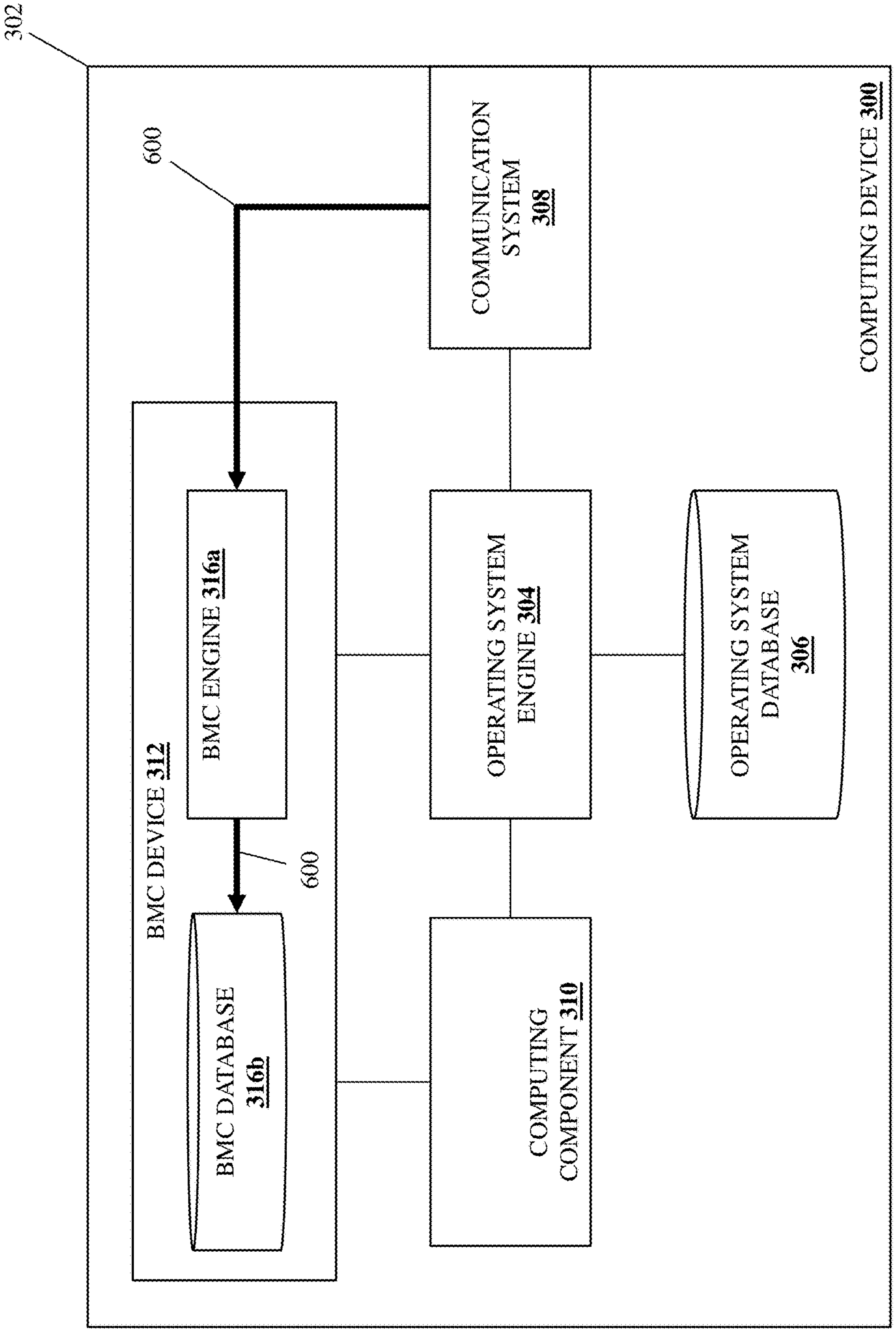
FIG. 6B is a schematic view illustrating an embodiment of the computing device of FIG. 3 operating during the method of FIG. 4.

The method 400 begins at block 402 where a BMC device identifies firmware that will be utilized by a computing component. With reference to FIGS. 6A and 6B, in an embodiment of block 402, the management device 206 may perform firmware update initiation operations 600 that may include a user of the management device 206 "triggering", beginning, or otherwise initiating a firmware provisioning process for the computing device 300 using any of a variety of firmware provisioning interfaces (e.g., firmware provisioning interfaces provided according to the REDFISH standard, a Remote Access Controller ADMinistrator (RACADM) interface, a Graphical User Interface (GUI), etc.) on the management device 206, and through the network 204 with the BMC engine 316*a* in the BMC device 312 of the computing device 202/300 via its communication system 308. As will be appreciated by one of skill in the art in possession of the present disclosure, the firmware provisioning initiation operations 600 may include the management device 206 transmitting to the BMC engine 316*a* the firmware package discussed above, an instruction to provide the firmware included in the firmware package on the computing component 310, and/or any other firmware provisioning initiation information that would be apparent to one of skill in the art in possession of the present disclosure.

In an embodiment of block 402 and in response to receiving the firmware package as part of the firmware update initiation operations 600, the BMC engine 316*a* in the BMC device 312 of the computing device 202/300 may authenticate the firmware package by verifying its digital signature/trusted digital certificate that was provided by the computing device manufacturer of the computing device 202/300 (or other entity providing the firmware) using any of a variety of digital signature/trusted digital certificate verification techniques that would be apparent to one of skill in the art in possession of the present disclosure. In response to authenticating the firmware package, the BMC engine 316*a* may store the firmware package in the BMC database 316*b*.

Figure 6C:
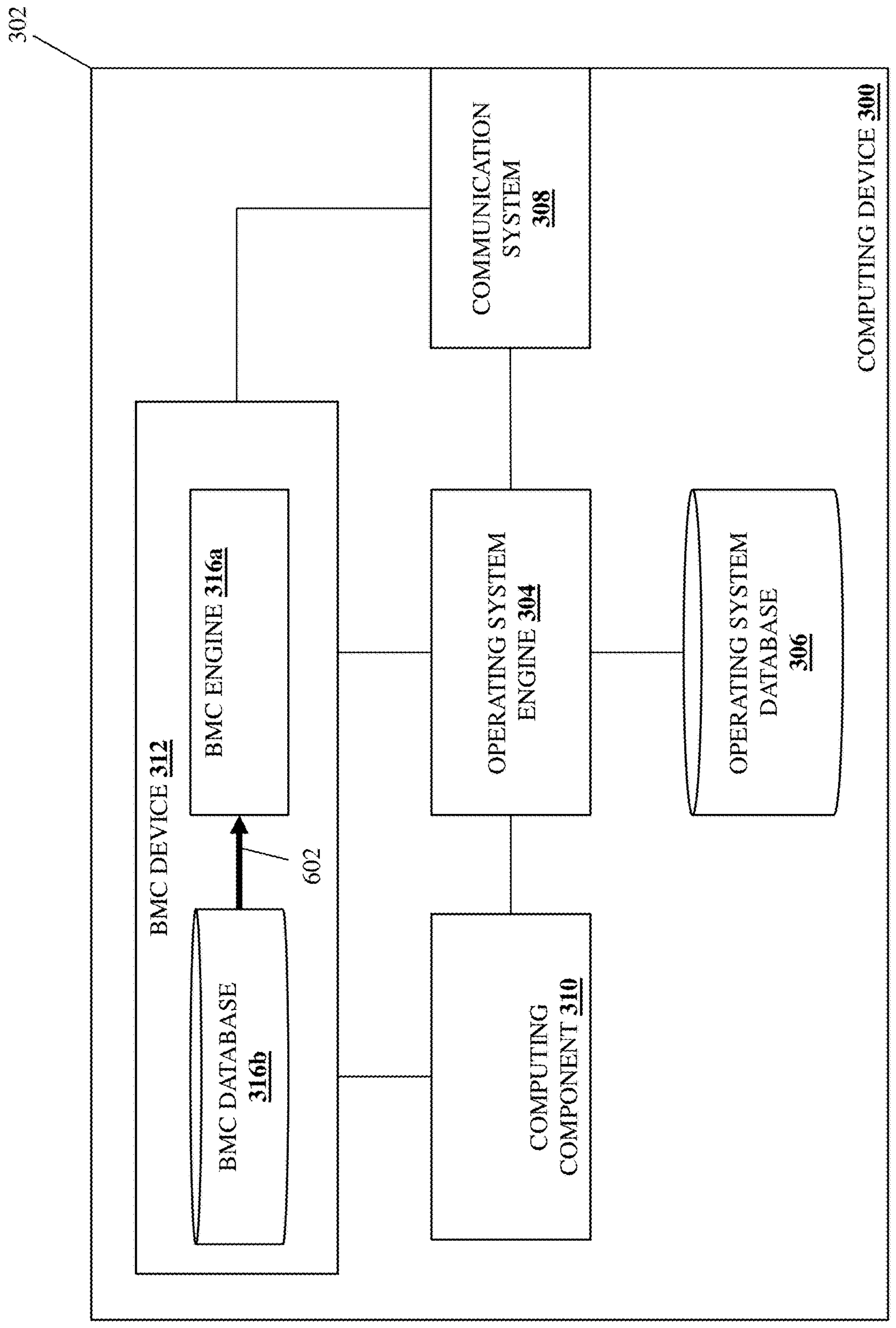
FIG. 6C is a schematic view illustrating an embodiment of the computing device of FIG. 3 operating during the method of FIG. 4.

With reference to FIG. 6C, in an embodiment of block 402, the BMC engine 316*a* in the BMC device 312 of the computing device 202/300 may perform firmware access operations 602 that may include accessing the firmware package in the BMC database 316*b*, identifying the firmware (e.g., the vendor-provided diagnostic tool(s)) included in the firmware package), parsing the firmware in the firmware package (e.g., the "package.xml" file discussed above), and determining a workload that is required to provide that firmware on the computing component 310 (e.g., using methods such as the Platform Level Data Model (PLDM) Type 5 that defines a protocol and a set of commands supporting an out-of-band firmware upgrade, a Firmware Management Protocol (FMP), a Virtual Media (VMedia) function that enables remote use of ISO images, a Remote File Share (RFS) function that enables the specifying of an ISO image available via shared storage via a network, etc., which one of skill in the art in possession of the present disclosure will appreciate is dependent on the particular component for which the firmware has been provided).

Figure 7A:
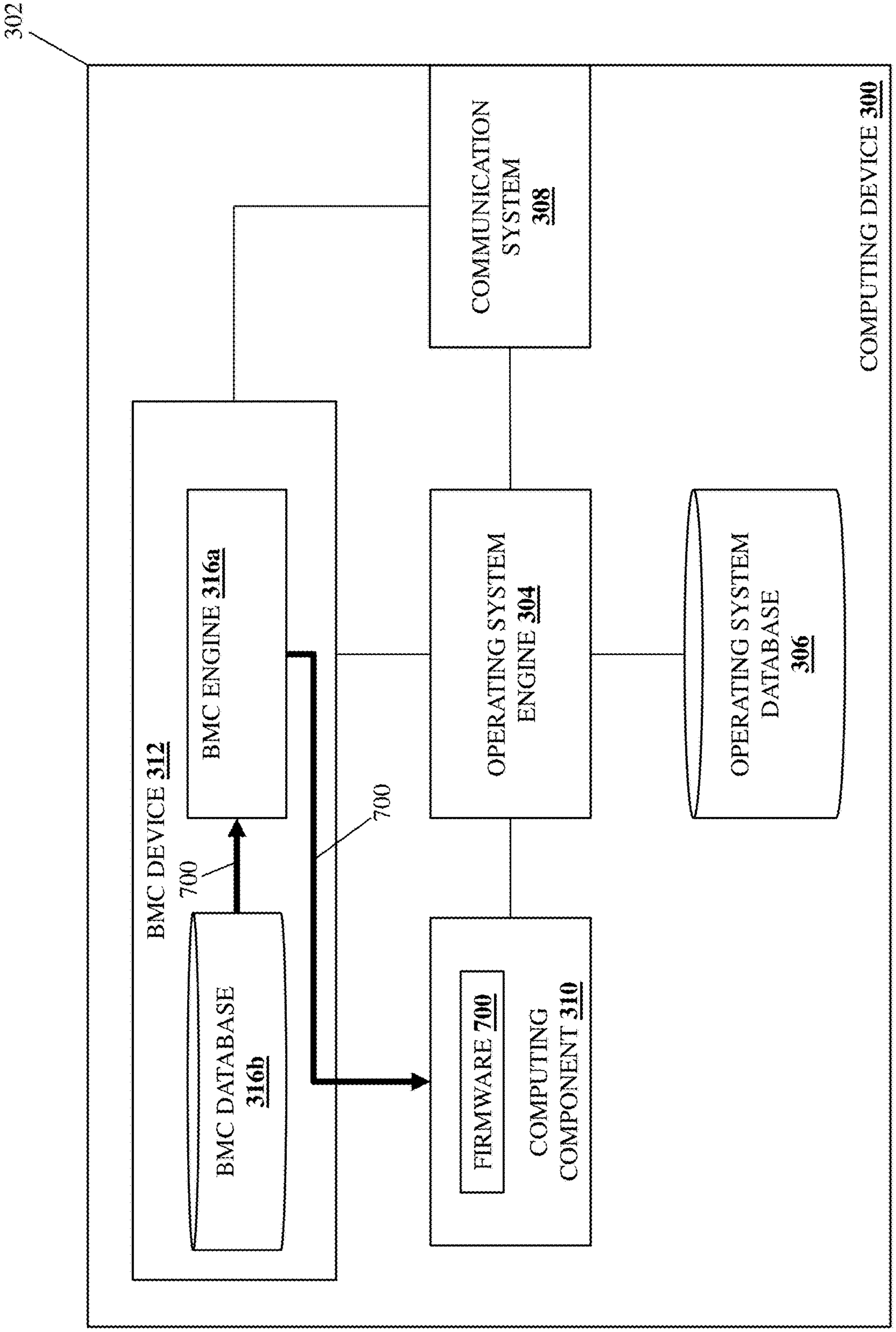
FIG. 7A is a schematic view illustrating an embodiment of the computing device of FIG. 3 operating during the method of FIG. 4.
Figure 7B:
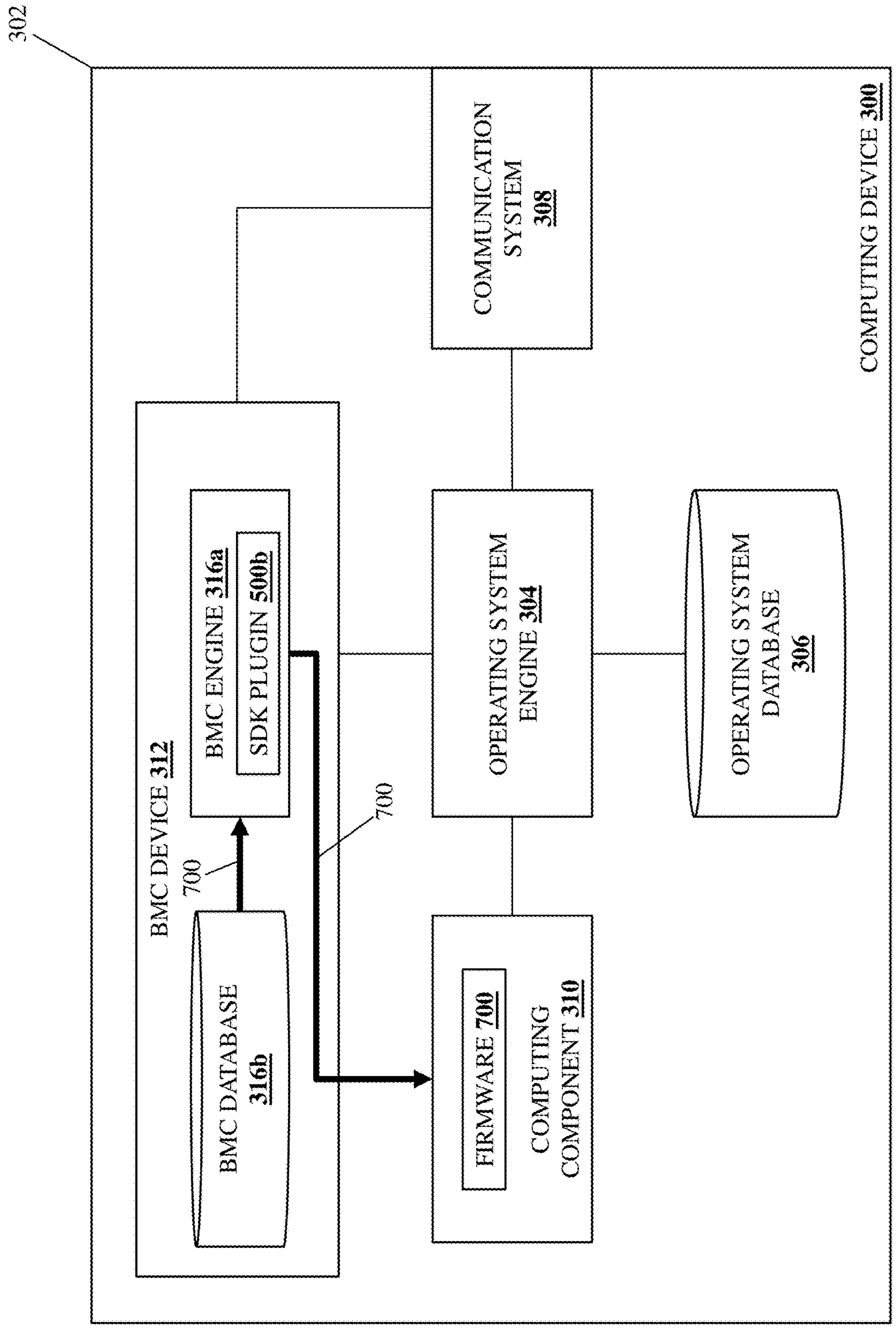
FIG. 7B is a schematic view illustrating an embodiment of the computing device of FIG. 3 operating during the method of FIG. 4.

With reference to FIG. 7A or 7B, in an embodiment of block 402 and in response to authenticating the firmware package, identifying the firmware, and determining how to provide that firmware on the computing component 310, the BMC engine 316*a* (either without an "existing" SDK plugin as illustrated in FIG. 7A, or with the "existing" SDK plugin 500*b* as illustrated in FIG. 7B) in the BMC device 312 of the computing device 202/300 may perform firmware provisioning operations 700 that include using the workload determined as discussed above to "inject", "install", and/or otherwise provide that firmware 700 on the computing component 310. Thus, one of skill in the art in possession of the present disclosure will appreciate that FIG. 7A illustrates how the firmware 700 may be "new" firmware that will be utilized by the computing component 310, while FIG. 7B illustrates how the firmware 700 may be a firmware "update" that is provided on the computing component 310 in place of the "existing" firmware 500*a* described above.

As will be appreciated by one of skill in the art in possession of the present disclosure, in either situation, the firmware provisioning operations 700 may also include determining whether the firmware 700 has been provided on the computing component 310 such that it is ready for execution (e.g., using the PLDM Type 5 discussed above, a PLDM Type 2 state sensor, an Original Equipment Manufacturer (OEM) status, and/or other firmware provisioning completion verification techniques that would be apparent to one of skill in the art in possession of the present disclosure).

Figure 8A:
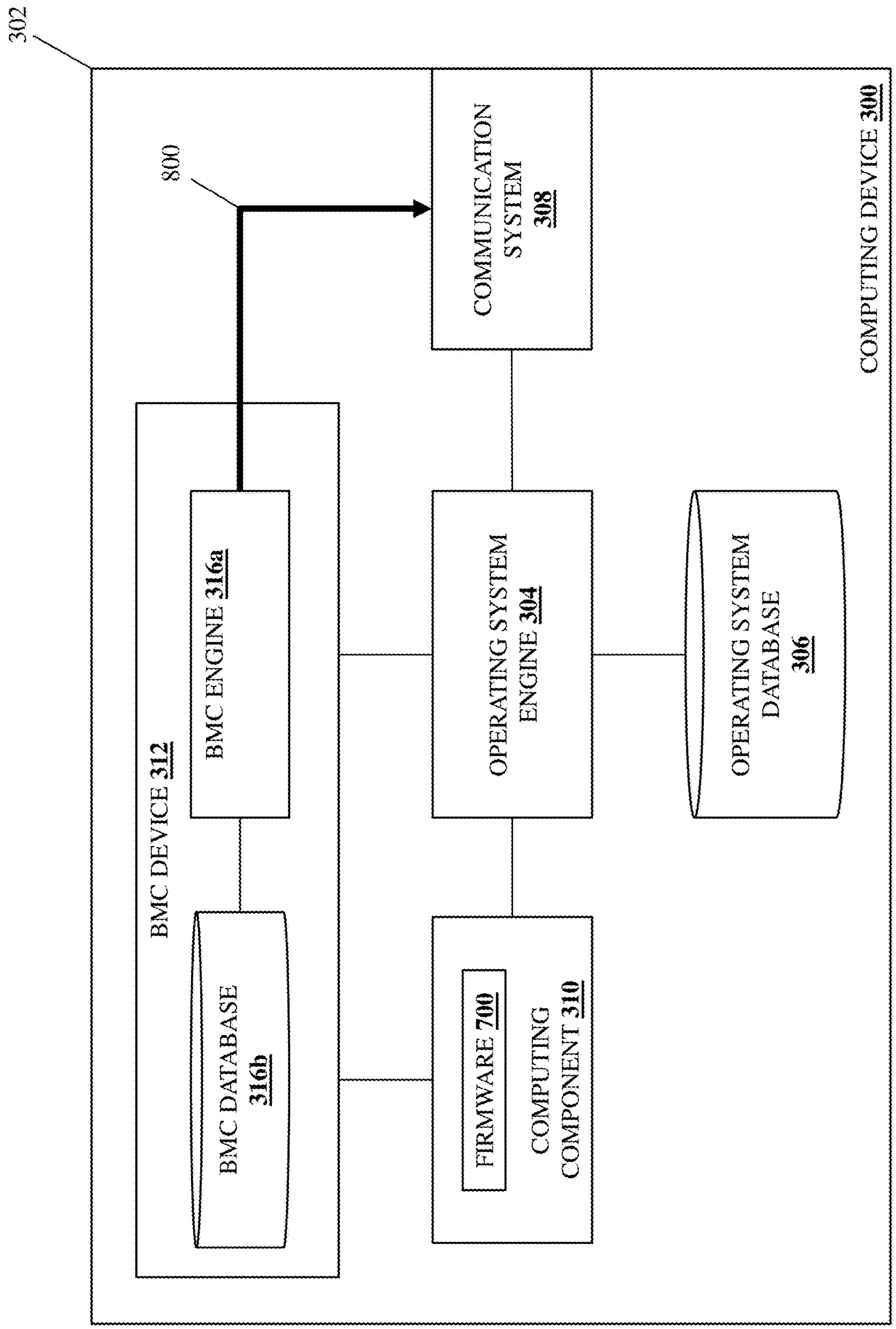
FIG. 8A is a schematic view illustrating an embodiment of the computing device of FIG. 3 operating during the method of FIG. 4.
Figure 8B:
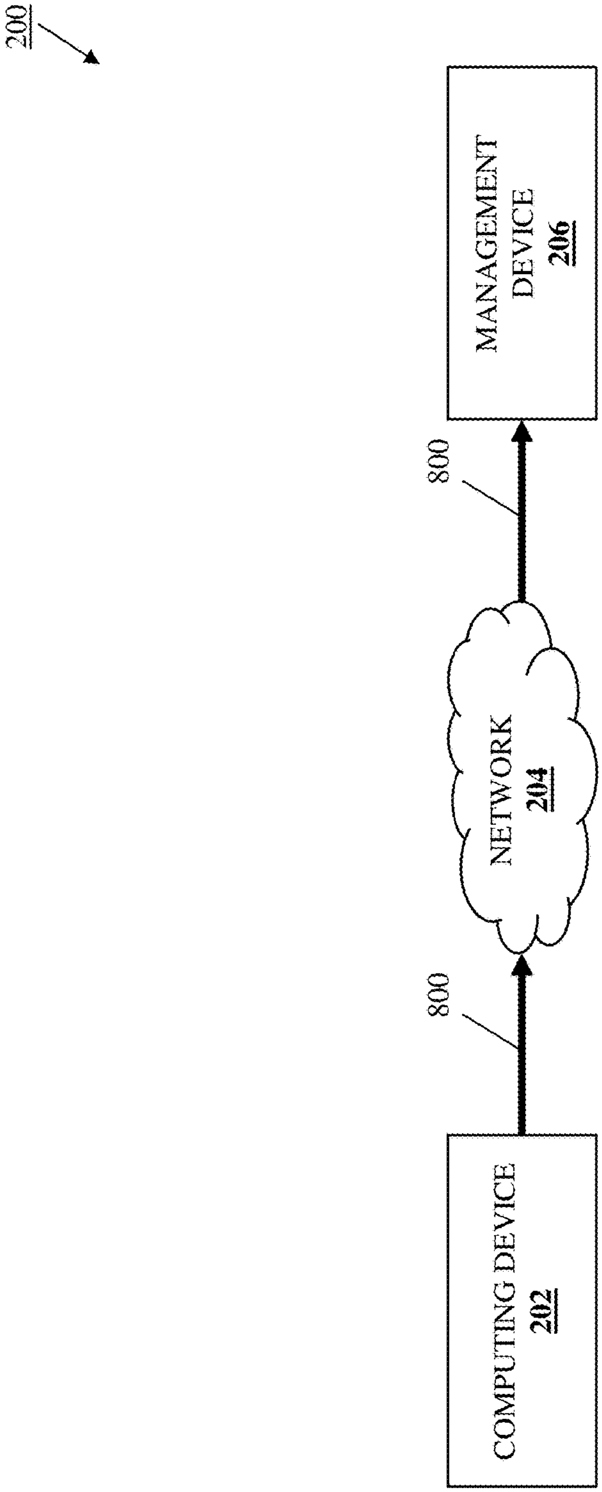
FIG. 8B is a schematic view illustrating an embodiment of the networked system of FIG. 2 operating during the method of FIG. 4.

With reference to FIGS. 8A and 8B, in some embodiments of block 402 and in response to verifying the completion of the firmware provisioning such that that firmware is ready for execution on the computing device 310, the BMC engine 316*a* in the BMC device 312 of the computing device 202/300 may perform firmware provisioning completion confirmation operations 800 that include providing an indication via its communication system 308 and through the network 204 to the management device 206 that the provisioning of the firmware 700 on the computing component 310 has completed (e.g., informing the management device 206 that the vendor-provided diagnostic tool(s) are ready to run on the computing component 310). In addition, the BMC engine 316*a* may configure an interface to the firmware 700 (e.g., a diagnostic tool interface available via a REDFISH Application Programming Interface (API)) such that it is accessible to the management device 206 via the network 204, and may configure a firmware initiation process (e.g., based on a PLDM Type 2 effector, the SDK plugin described below, a Unified Extensible Firmware Interface (UEFI) application, etc.) to enable the initiation of the firmware 700.

Figure 9A:
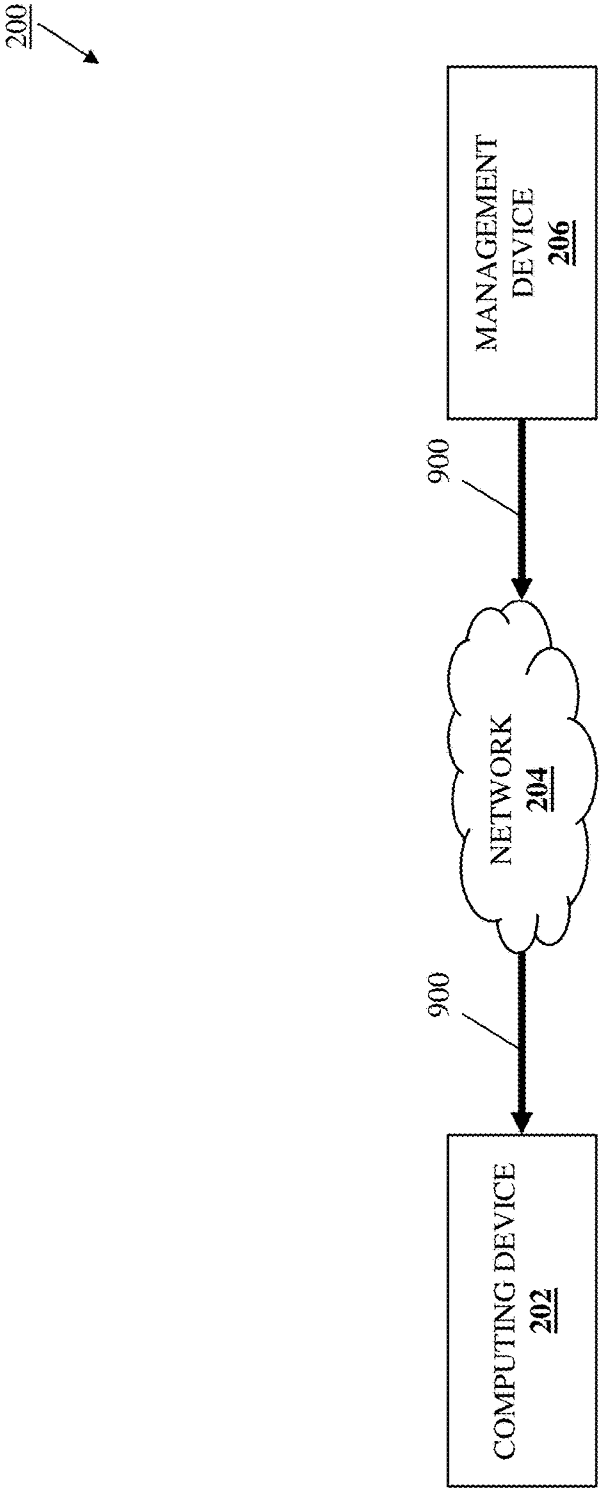
FIG. 9A is a schematic view illustrating an embodiment of the networked system of FIG. 2 operating during the method of FIG. 4.
Figure 9B:
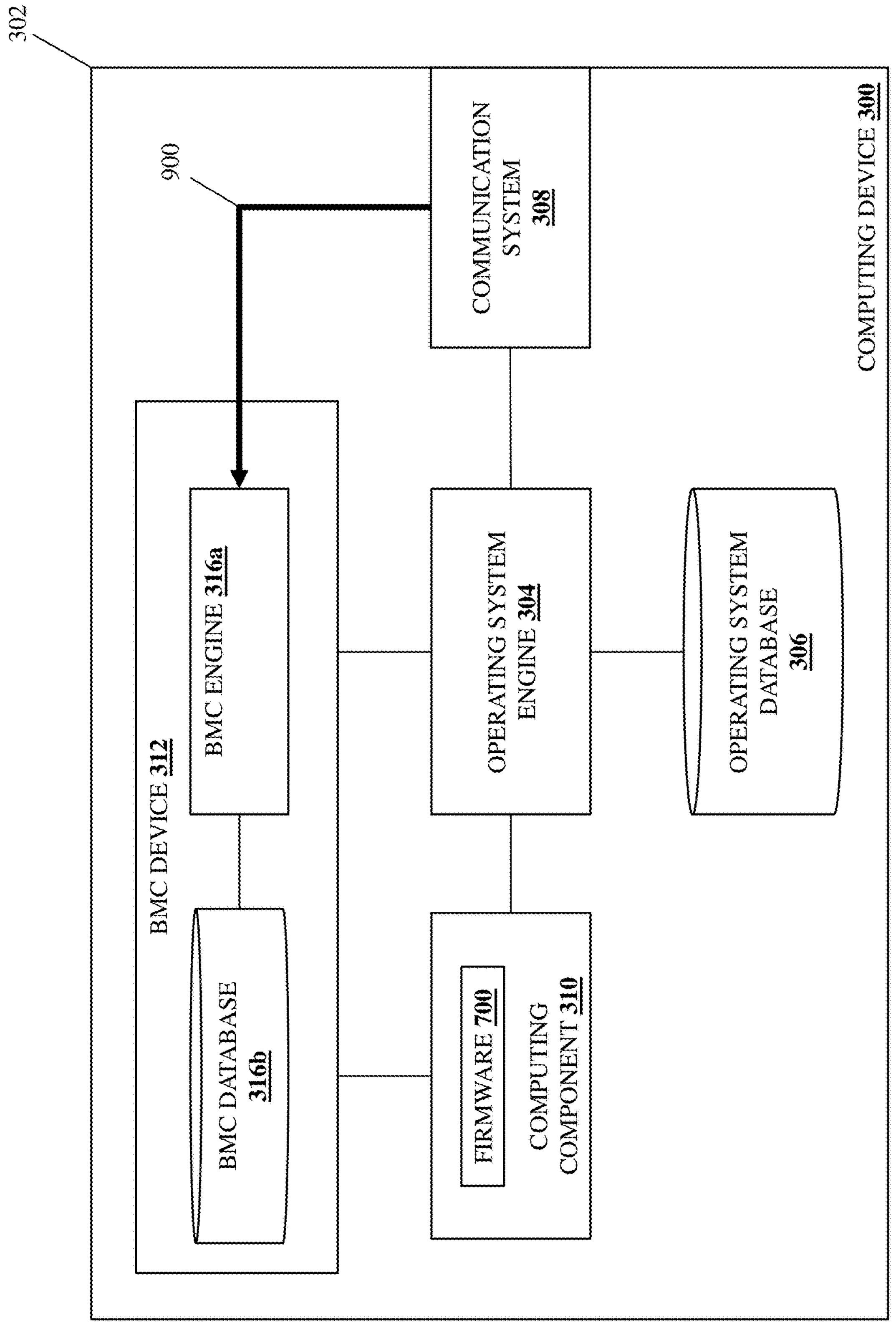
FIG. 9B is a schematic view illustrating an embodiment of the computing device of FIG. 3 operating during the method of FIG. 4.
Figure 9C:
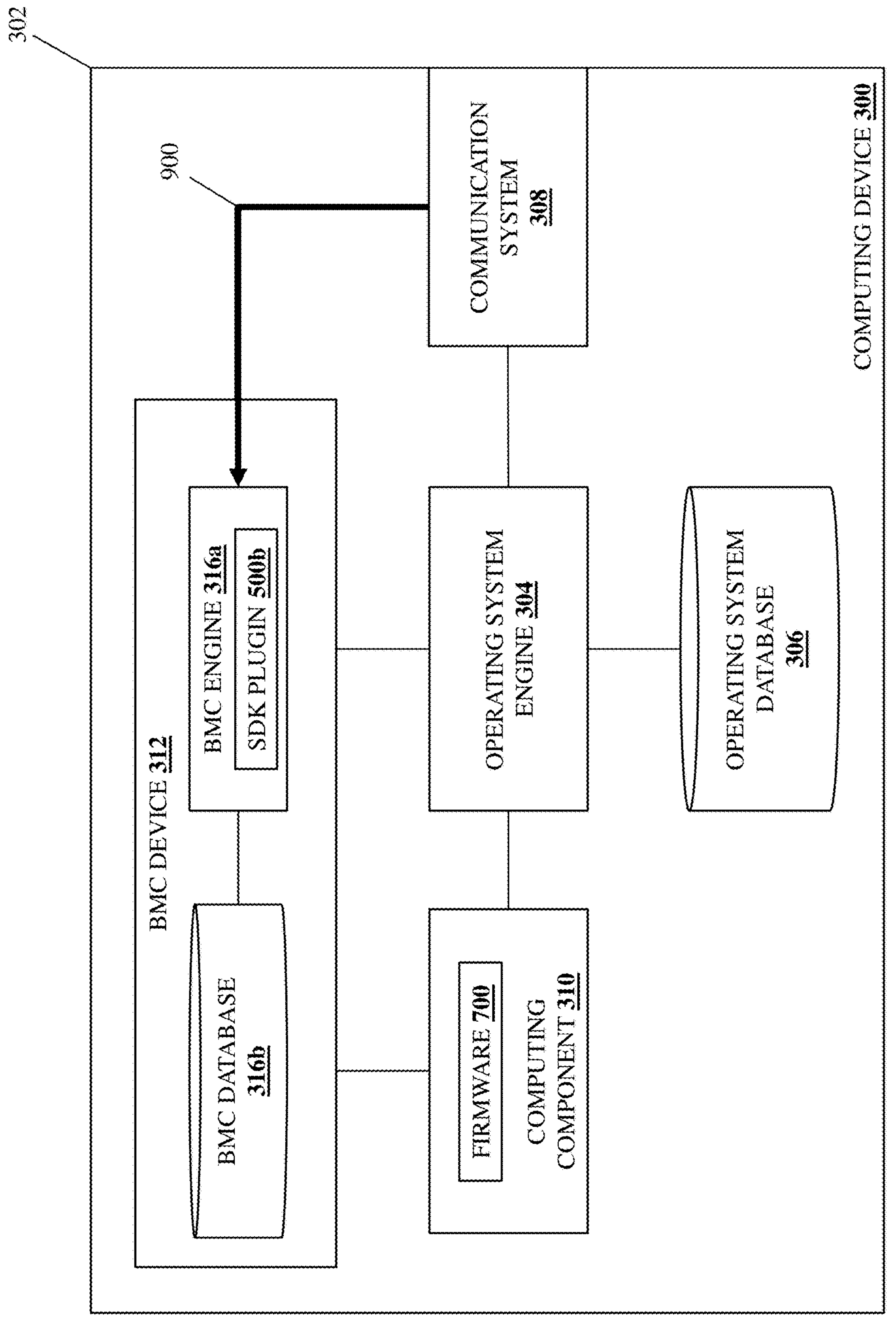
FIG. 9C is a schematic view illustrating an embodiment of the computing device of FIG. 3 operating during the method of FIG. 4.

With reference to FIGS. 9A, 9B, and 9C, the management device 206 may perform firmware functionality initiation operations 900 through the network 204 and with the BMC engine 316*a* (either without an "existing" SDK plugin as illustrated in FIG. 9B, or with the "existing" SDK plugin 500*b* as illustrated in FIG. 9C) in the BMC device 312 of the computing device 202/300 via its communication system 308. As will be appreciated by one of skill in the art in possession of the present disclosure, the firmware functionality initiation operations 900 may include a user of the management device 206 "triggering" or otherwise requesting the initiation of firmware functionality of the firmware 700 that was provided on the computing component 310 (e.g., initiating a diagnostic tool, a debug process, etc.) using any of a variety of firmware functionality initiation techniques that would be apparent to one of skill in the art in possession of the present disclosure.

As such, some embodiments of the method 400 may include the BMC engine 316*a* on the BMC device 312 in the computing device 202/300 identifying the firmware 700 that will be utilized by the computing component 310 subsequent to providing that firmware 700 on that computing component 310 as described above, and the identification of the firmware 700 that will be utilized by the computing component 310 may also follow the BMC engine 316*a* making that firmware 700 accessible to the management device 206, and the user of the management device 206 requesting the initiation of that firmware 700 as described above. However, one of skill in the art in possession of the present disclosure will appreciate how the identifying of the firmware 700 that will be utilized by the computing component 310 may be performed by the BMC engine 316*a* prior to providing that firmware 700 on the computing component 310, subsequent to providing that firmware 700 on the computing component 310 but prior to making that firmware 700 accessible to the management device 206 and/or prior to the user of the management device 206 requesting the initiation of that firmware 700, and/or at other times that would be apparent to one of skill in the art in possession of the present disclosure.

The method 400 then proceeds to block 404 where the BMC device determines an SDK plugin, which is not currently configured for use by the BMC device, is required to interact with the firmware. In an embodiment, at block 404 and in response to the identification of the firmware 700 that will be utilized by the computing component 310 at block 402, the BMC engine 316*a* in the BMC device 312 of the computing device 202/300 may determine that an SDK plugin is required to interact with the firmware 700, and one of skill in the art in possession of the present disclosure will appreciate how the determination that an SDK plugin is required to interact with the firmware 700 may be a determination that a "new" SDK plugin is required to interact with the "new" firmware 700 that was provided on the computing component 310 as described above with reference to FIG. 7A, or be a determination that an SDK plugin "update" to the "existing" SDK plugin 500*b* is required to interact with the "updated" firmware 700 that updated the "existing" firmware 500*a* on the computing component 310 as described above with reference to FIG. 7B.

To provide a specific example, at block 404 and in response to identifying the firmware at block 402, the BMC engine 316*a* in the BMC device 312 of the computing device 202/300 may perform "pre-requisite" operations and/or other pre-processing operations known in the art that may include determining whether the BMC engine 316*a* is configured to interact with the firmware 700 (e.g., whether the BMC engine 316*a* is configured to run the diagnostic tool(s) discussed above) and, in response, may determine that an SDK plugin is required to do so. Furthermore, while not illustrated or described in detail, in some embodiments an "existing" SDK plugin (e.g., the "existing" SDK plugin 500*b*) that is currently configured for use by the BMC engine 316*a* may allow the BMC engine 316*a* to interact with the "updated" firmware 700, and thus the provisioning of the SDK plugin "update" on the BMC engine 316*a* as described below will not be required.

Figure 10A:
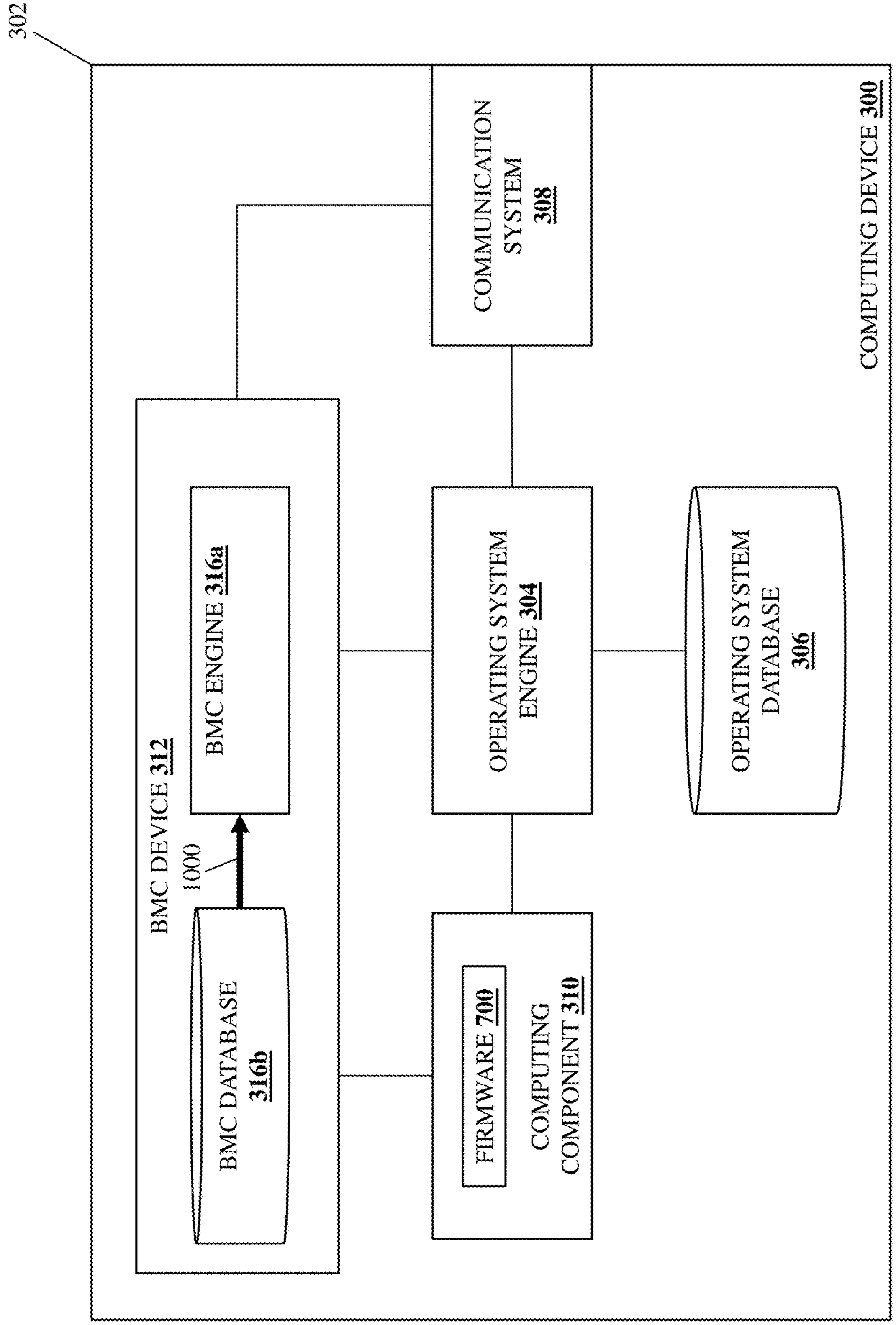
FIG. 10A is a schematic view illustrating an embodiment of the computing device of FIG. 3 operating during the method of FIG. 4.
Figure 10B:
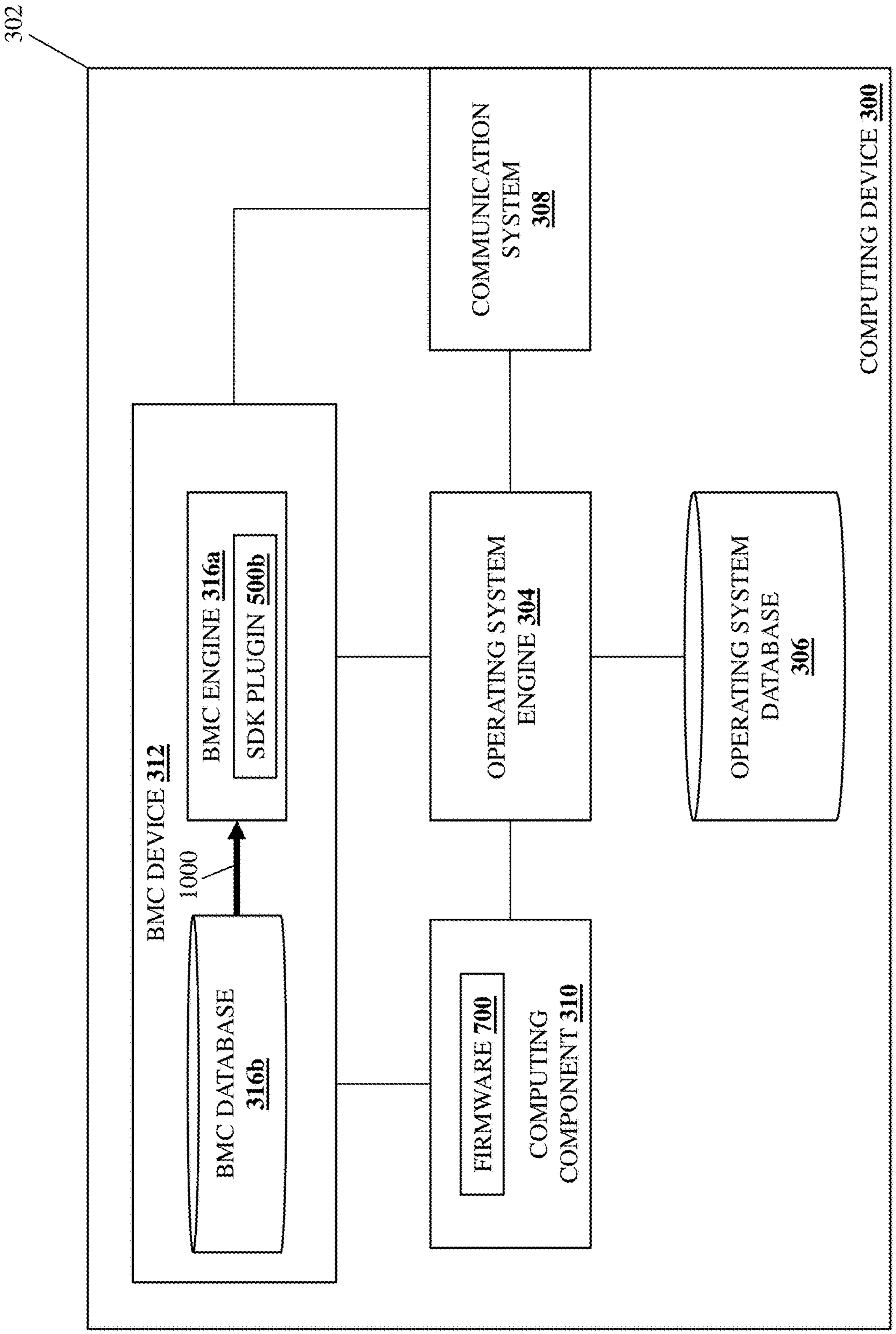
FIG. 10B is a schematic view illustrating an embodiment of the computing device of FIG. 3 operating during the method of FIG. 4.
Figure 11A:
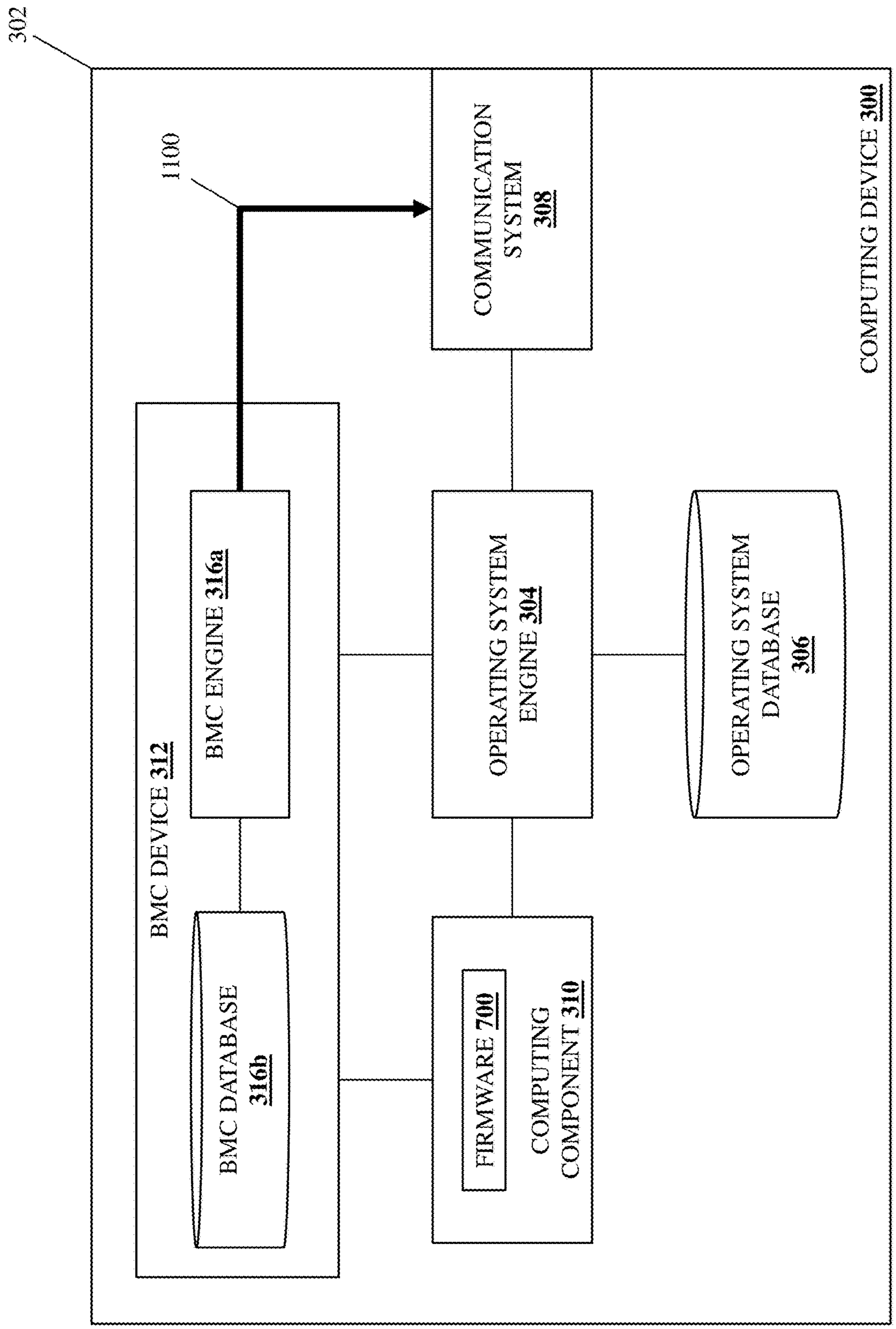
FIG. 11A is a schematic view illustrating an embodiment of the computing device of FIG. 3 operating during the method of FIG. 4.
Figure 11B:
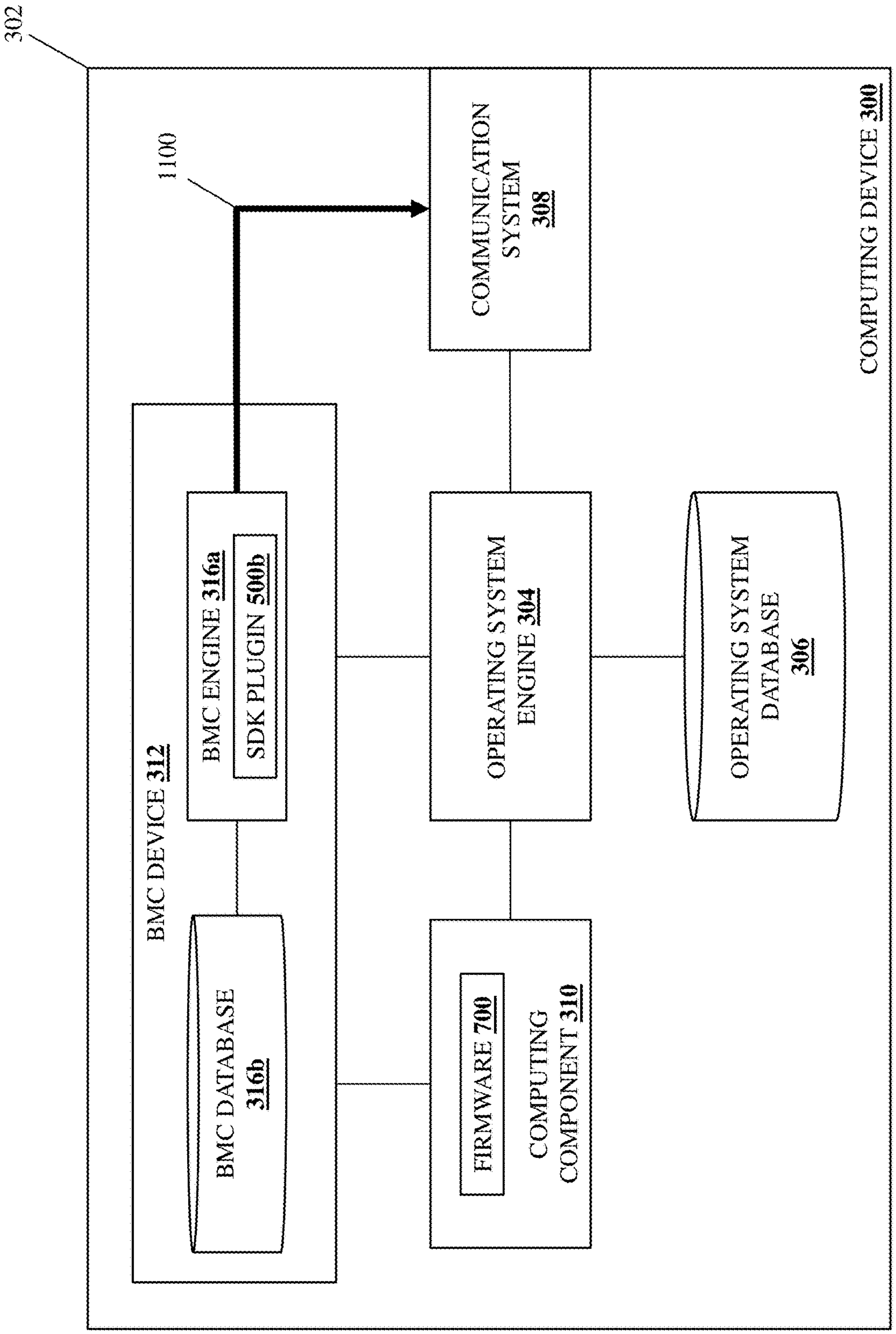
FIG. 11B is a schematic view illustrating an embodiment of the computing device of FIG. 3 operating during the method of FIG. 4.
Figure 11C:
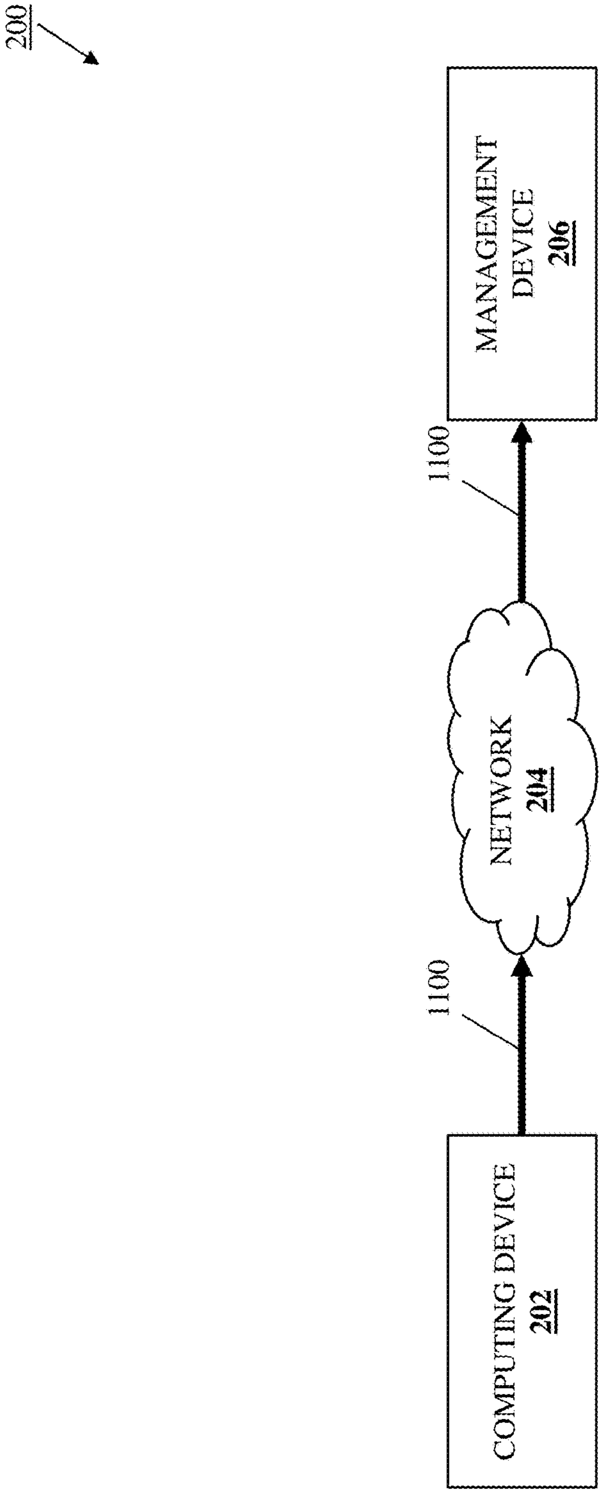
FIG. 11C is a schematic view illustrating an embodiment of the networked system of FIG. 2 operating during the method of FIG. 4.

The method 400 then proceeds to block 406 where the BMC device accesses the SDK plugin. With reference to FIGS. 10A and 10B, in some embodiments of block 406, the BMC engine 316*a* (either without an "existing" SDK plugin as illustrated in FIG. 10A, or with the "existing" SDK plugin 500*b* as illustrated in FIG. 10B) in the BMC device 312 of the computing device 202/300 may perform SDK plugin access operations 1000 that may include accessing the SDK plugin included in firmware package that was stored in the BMC database 316*b*. With reference to FIGS. 11A, 11B, and 11C, in other embodiments of block 406 (e.g., when no SDK plugin was included in firmware package discussed above), the BMC engine 316*a* (either without an "existing" SDK plugin as illustrated in FIG. 11A, or with the "existing" SDK plugin 500*b* as illustrated in FIG. 11B) in the BMC device 312 of the computing device 202/300 may perform SDK plugin request operations 1100 that may include transmitting an SDK plugin request via its communication system 308 and through the network 204 to the management device 206, with the SDK plugin request requesting an SDK plugin (or access information for an SDK plugin) that is configured to enable the BMC engine 316*a* to interact with the firmware that was received from the management device 206 as described above, as well as any other SDK plugin request information that would be apparent to one of skill in the art in possession of the present disclosure.

Figure 11D:
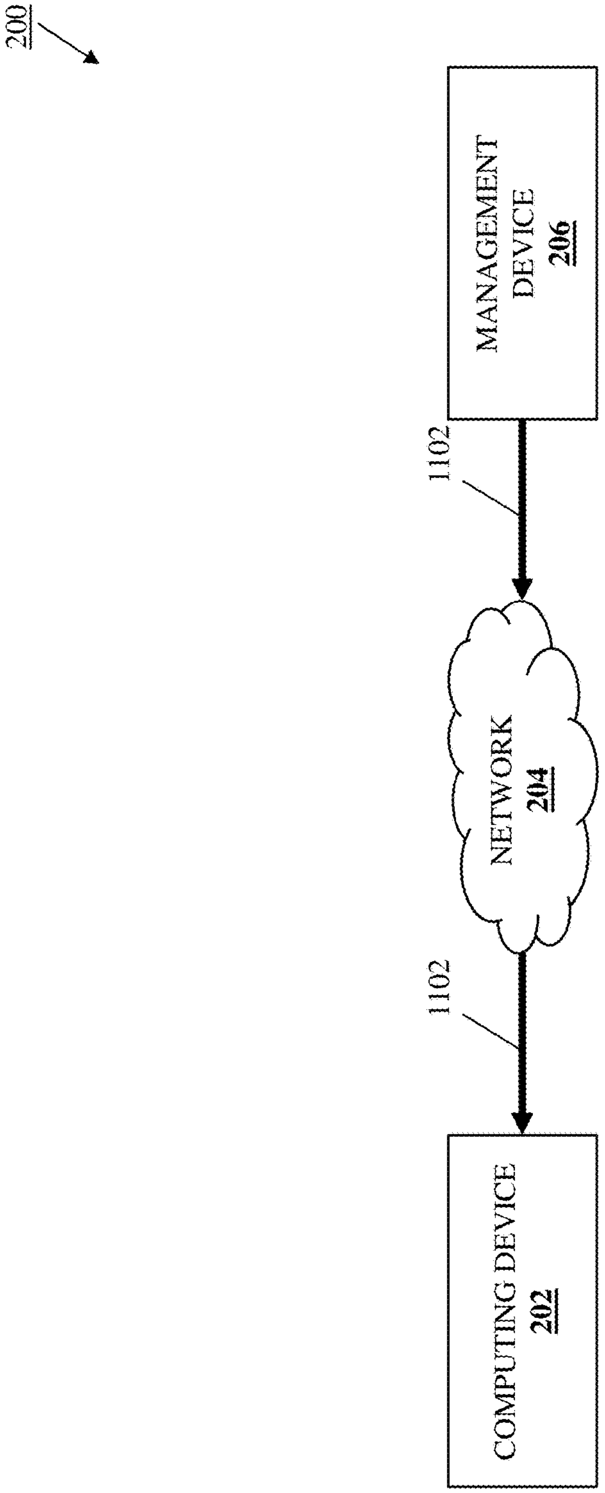
FIG. 11D is a schematic view illustrating an embodiment of the networked system of FIG. 2 operating during the method of FIG. 4.
Figure 11E:
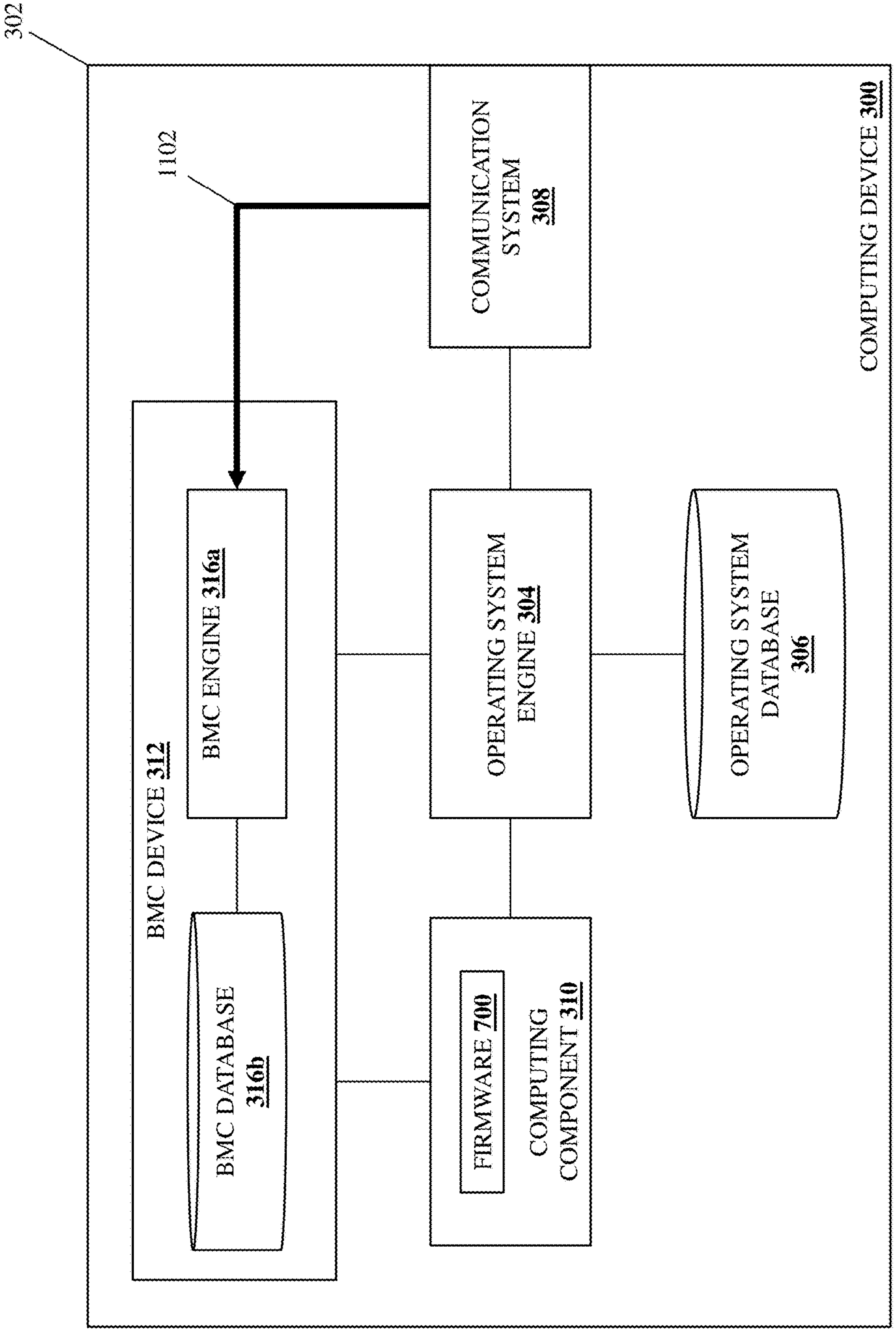
FIG. 11E is a schematic view illustrating an embodiment of the computing device of FIG. 3 operating during the method of FIG. 4.
Figure 11F:
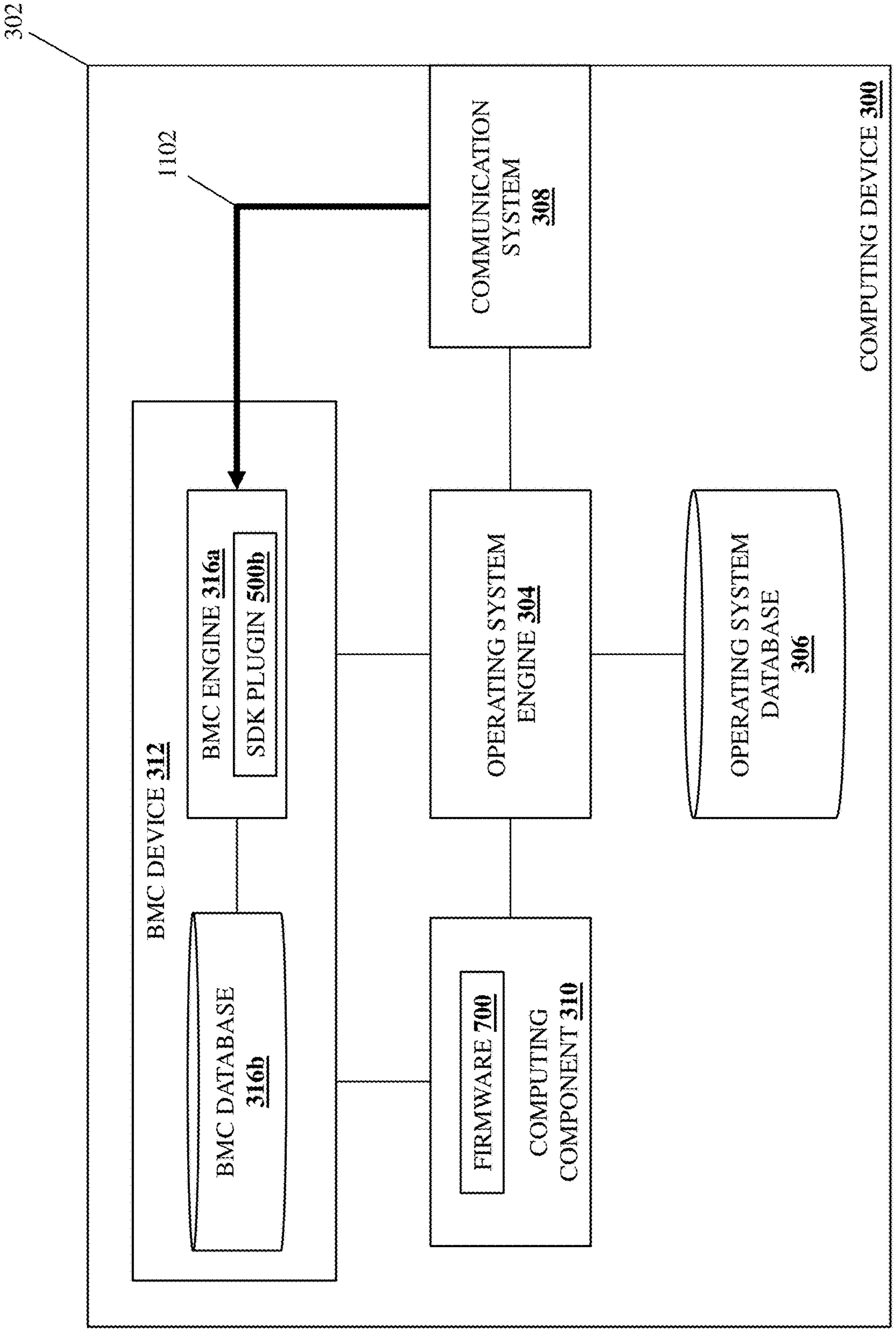
FIG. 11F is a schematic view illustrating an embodiment of the computing device of FIG. 3 operating during the method of FIG. 4.

With reference to FIGS. 11D, 11E, and 11F, the management device 206 may then perform SDK plugin provisioning operations 1102 that include transmitting an SDK plugin (or SDK plugin access information) via the network 204 and to the BMC engine 316*a* (either without an "existing" SDK plugin as illustrated in FIG. 11E, or with the "existing" SDK plugin 500*b* as illustrated in FIG. 11F) in the BMC device 312 of the computing device 202/300 via its communication system 308. As will be appreciated by one of skill in the art in possession of the present disclosure, in the event the BMC engine 316*a* receives SDK plugin access information from the management device 206 at block 406, the BMC engine 316*a* may use that SDK plugin access information to access and retrieve a corresponding SDK plugin from any of a variety of locations that would be apparent to one of skill in the art in possession of the present disclosure.

Figure 12:
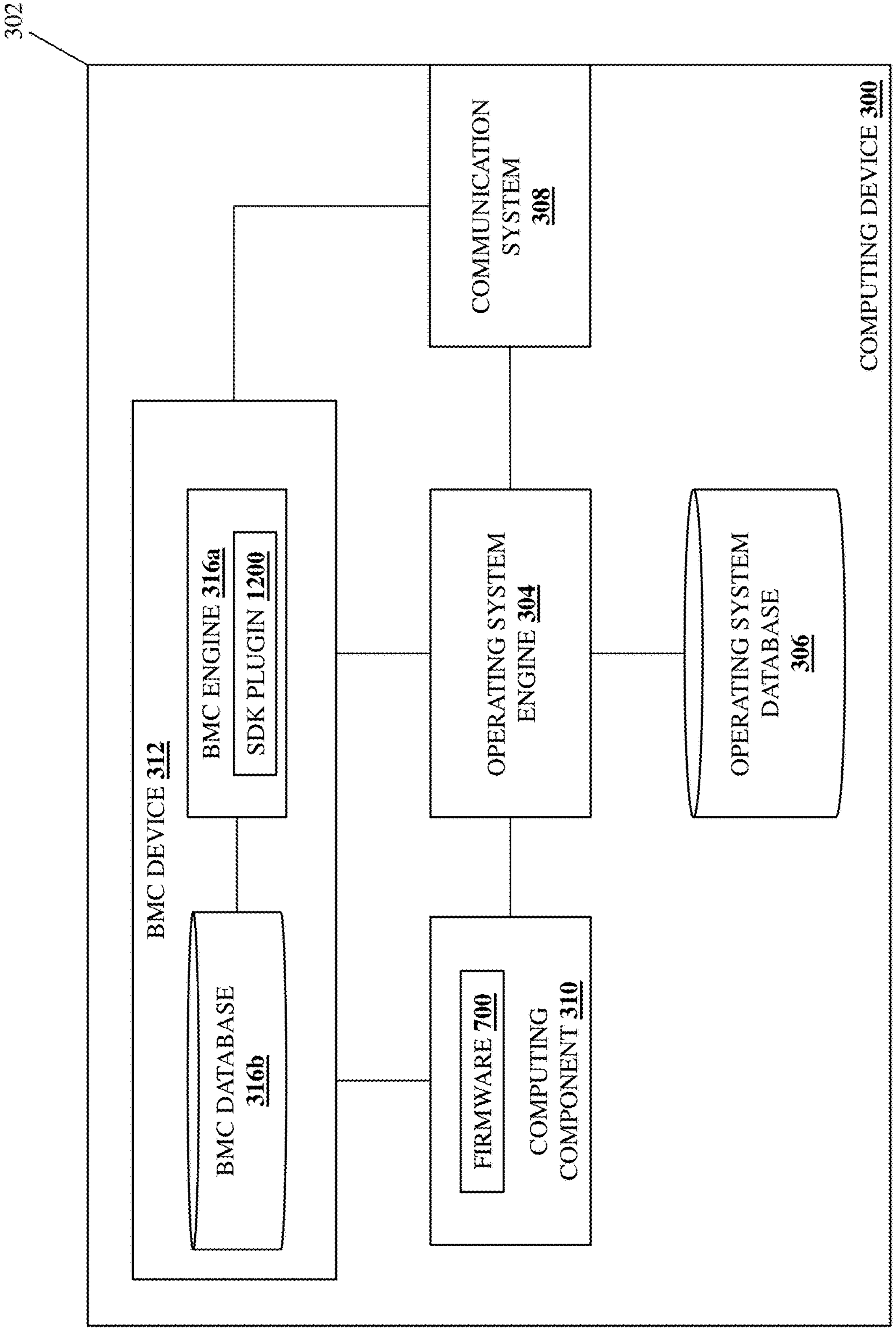
FIG. 12 is a schematic view illustrating an embodiment of the computing device of FIG. 3 operating during the method of FIG. 4.

The method 400 then proceeds to block 408 where the BMC device configures the SDK plugin for use by the BMC device. With reference to FIG. 12, in an embodiment of block 408, the BMC engine 316*a* in the BMC device 312 of the computing device 202/300 may perform SDK plugin configuration operations in order to configure an SDK plugin 1200 for use by the BMC engine 316*a* in interacting with the firmware 700 provided in the computing component 310. As discussed above and as will be appreciated by one of skill in the art in possession of the present disclosure, the SDK plugin 1200 configured for use by the BMC engine 316*a* at block 408 may be a "new" SDK plugin 1200 that is configured for use by the BMC engine 316*a* to enable the BMC engine 316*a* to interact with the "new" firmware 700 that was provided on the computing component 310, or may be an SDK plugin "update" to the "existing" SDK plugin 500*b* that is configured for use by the BMC engine 316*a* to enable the BMC engine 316*a* to interact with the "updated" firmware 700 that updated the "existing" firmware 500*a* on the computing component 310.

Figure 13:
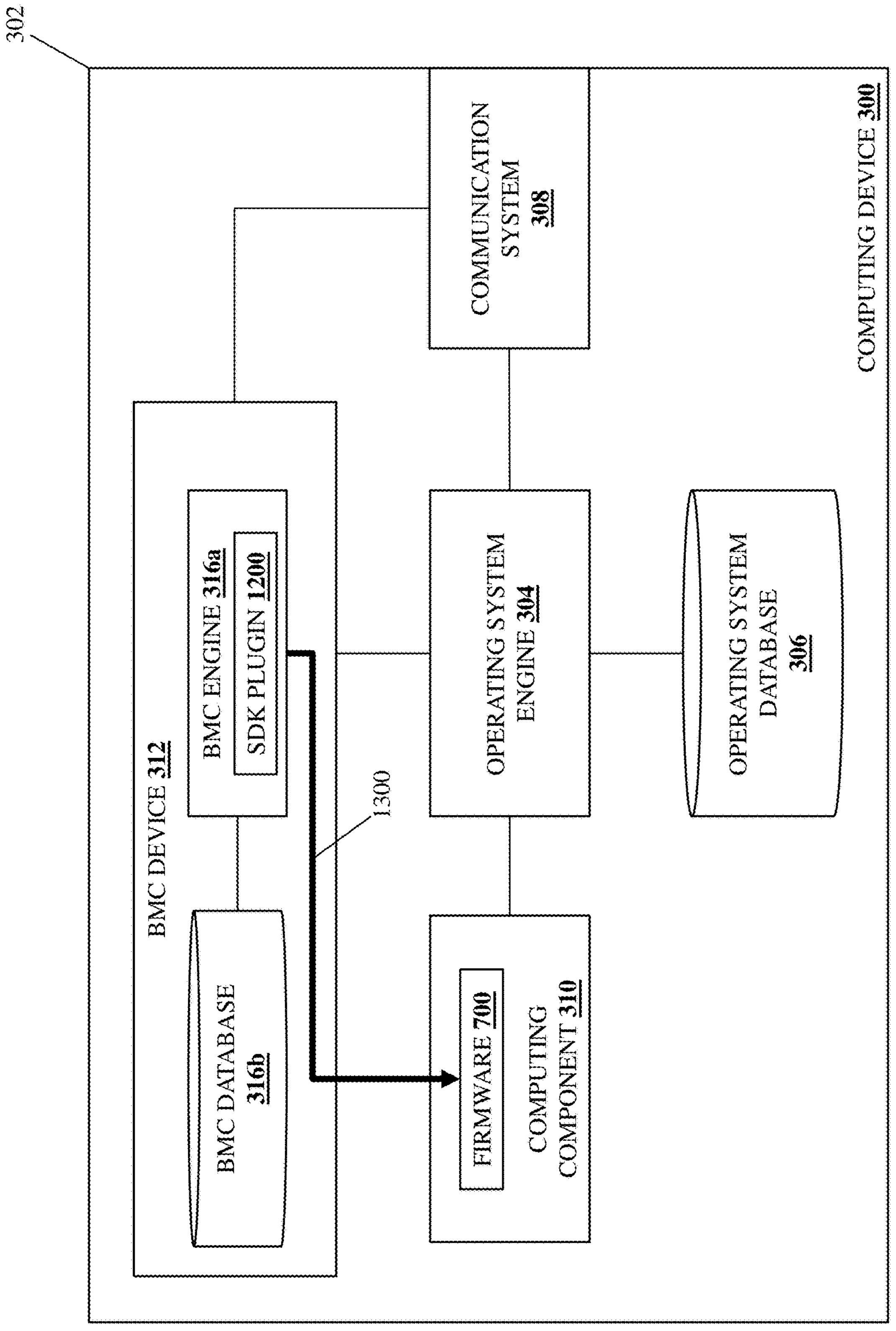
FIG. 13 is a schematic view illustrating an embodiment of the computing device of FIG. 3 operating during the method of FIG. 4.
Figure 14:
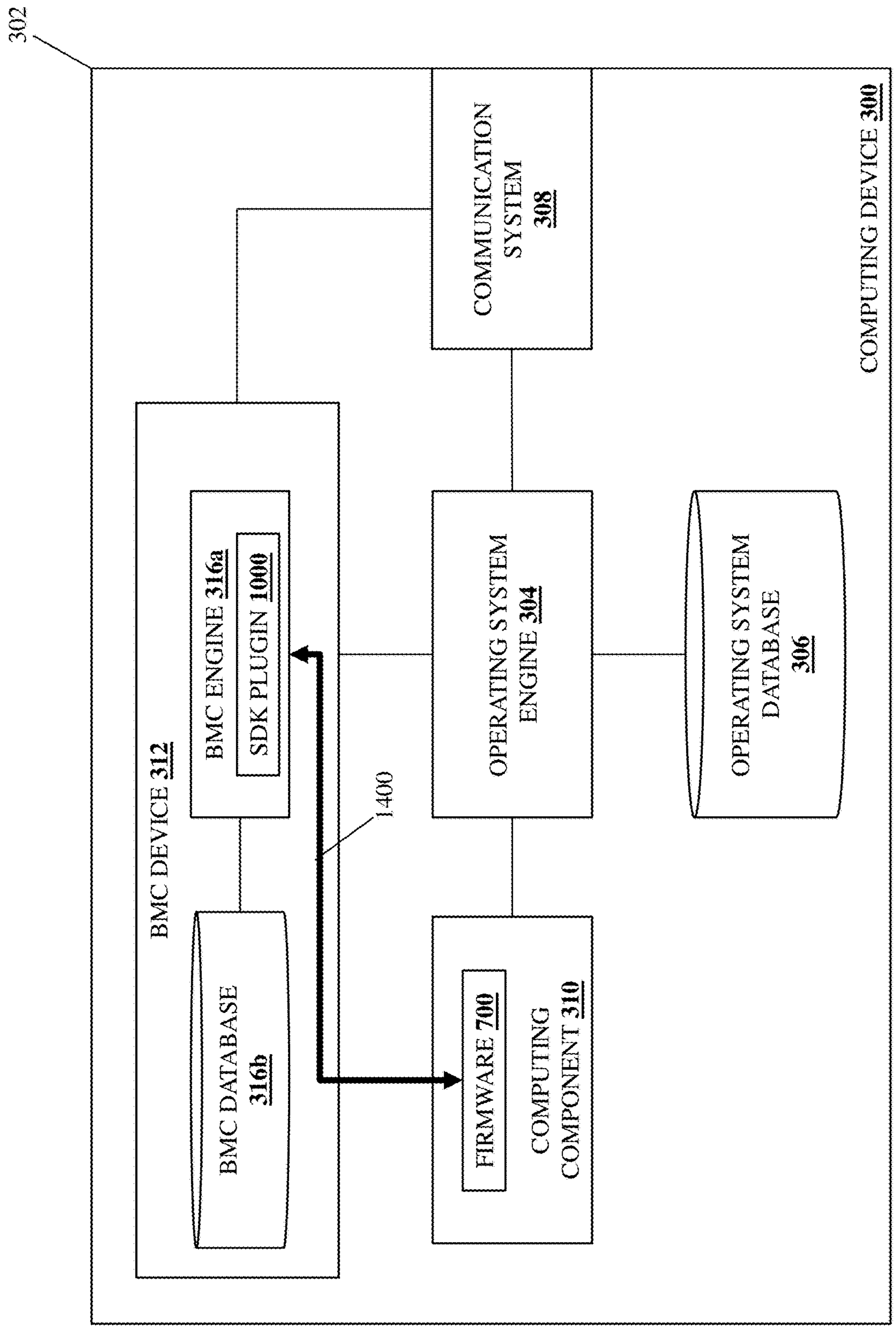
FIG. 14 is a schematic view illustrating an embodiment of the computing device of FIG. 3 operating during the method of FIG. 4.

The method 400 then proceeds to block 410 where the BMC device uses the SDK plugin to interact with the firmware. With reference to FIG. 13, in an embodiment of block 410, the BMC engine 316*a* in the BMC device 312 of the computing device 202/300 may perform firmware initiating operations 1300 that may include initiating the firmware 700 provided on the computing component 310 using the firmware initiation process it configured as described above (e.g., using the PLDM Type 2 effector, the SDK plugin 1200, the UEFI application, etc.). With reference to FIG. 14, in some embodiments of block 410, the BMC engine 316*a* may also perform firmware interaction operations 1400 that may include interacting with the firmware 700 provided on the computing component 310 during its operation following its initiation (e.g., by polling the progress of diagnostic tool(s) provided by the firmware 700 using a PLDM Type 2 sensor, the SDK plugin 1200, a UEFI protocol API, etc.). In some embodiments, the firmware interaction operations 1400 that may also include interacting with the firmware 700 provided on the computing component 310 following the completion of its operation (e.g., by collecting diagnostics results of diagnostic tool(s) provided by the firmware 700 via a serial communication channel, Non-Volatile Memory express Management Interface (NVMe-MI) or Compute eXpress Logic Component Command Interface (CXL-CCI) device logs, the SDK plugin, etc.). However, while several specific examples of SDK-plugin-enabled BMC/firmware interactions have been described, one of skill in the art in possession of the present disclosure will appreciate how a variety of SDK-plugin-enabled BMC/firmware interactions will fall within the scope of the present disclosure as well.

Figure 15A:
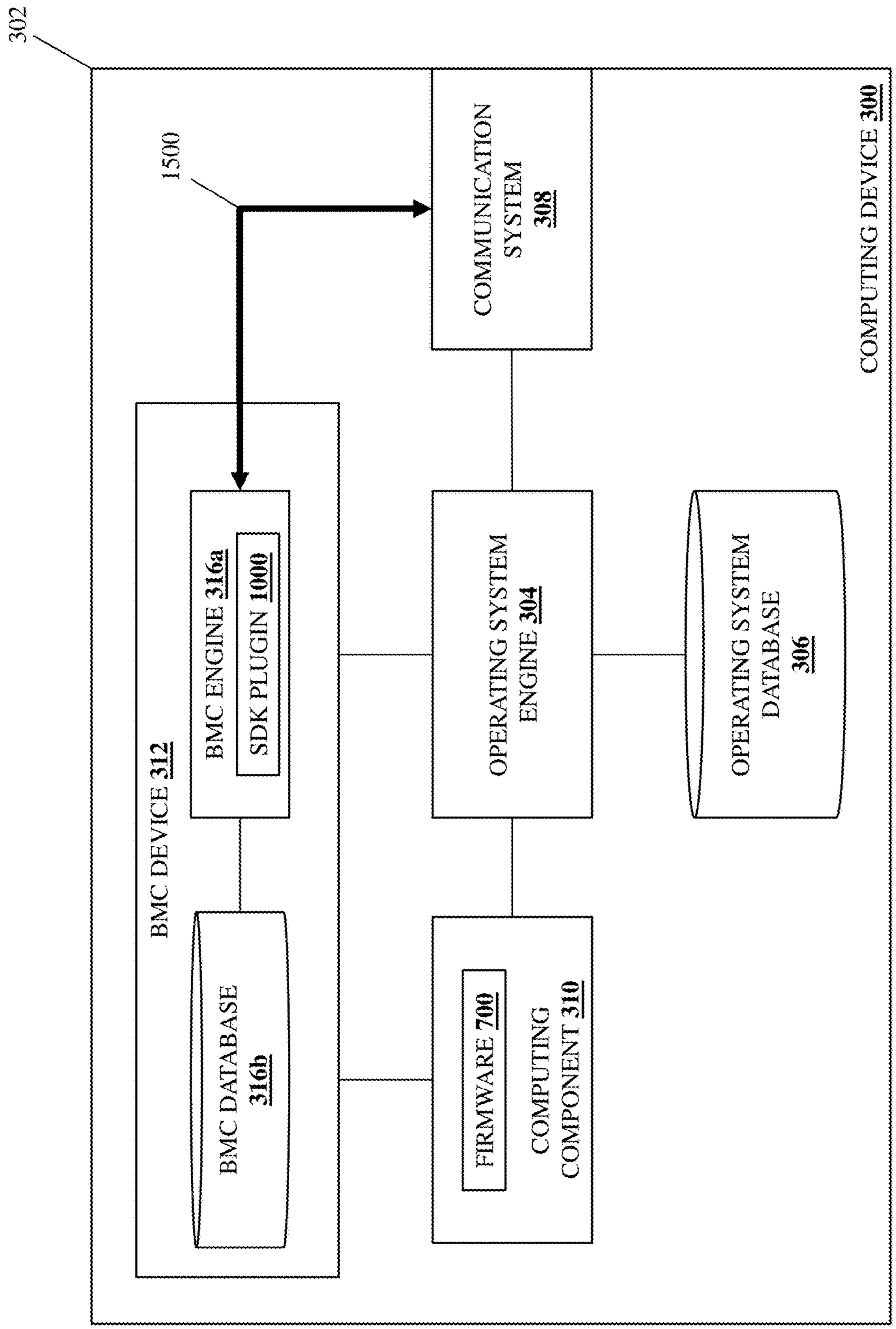
FIG. 15A is a schematic view illustrating an embodiment of the computing device of FIG. 3 operating during the method of FIG. 4.
Figure 15B:
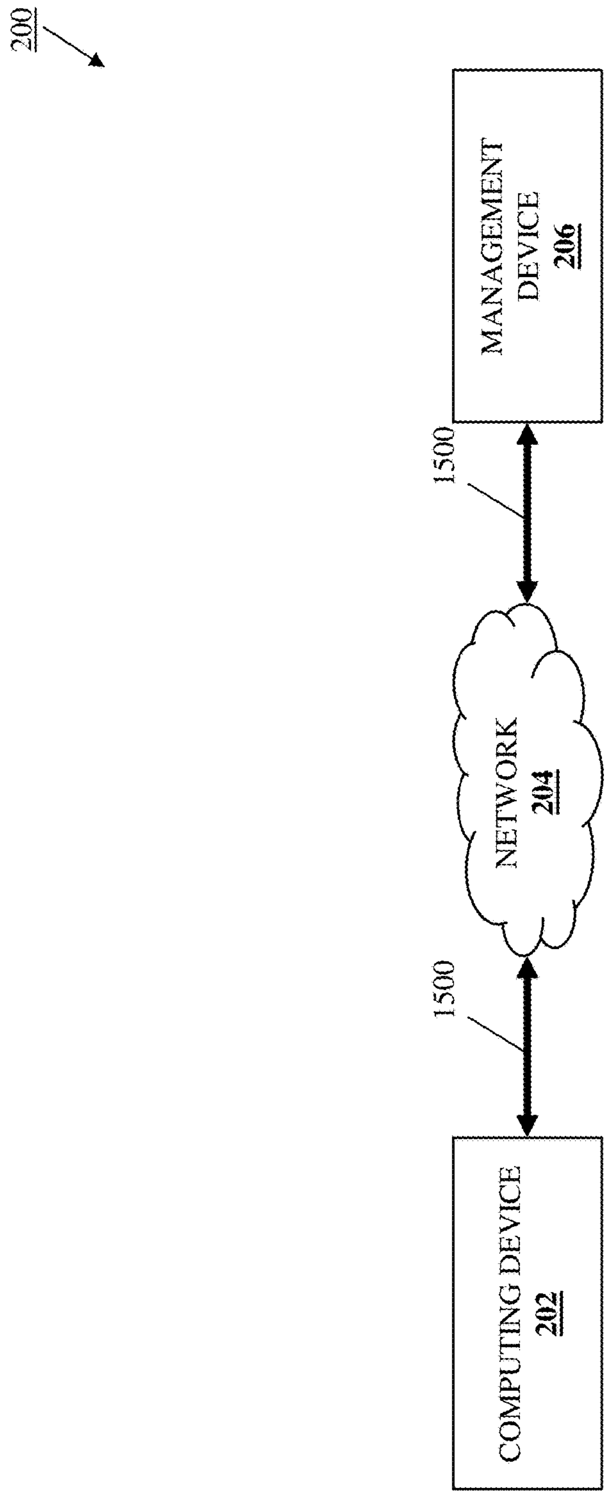
FIG. 15B is a schematic view illustrating an embodiment of the networked system of FIG. 2 operating during the method of FIG. 4.

With reference to FIGS. 15A and 15B, in some embodiments of block 410 and following the completion of the firmware operations, the BMC engine 316*a* in the BMC device 312 of the computing device 202/300 may perform firmware operation result sharing operations 1500 via its communication system 308 and through the network 204 with the management device 206, and those firmware operation result sharing operations 1500 may include allowing the management device 206 to access the firmware operation results (e.g., the diagnostics/debug results collected as described above) by exposing a Redfish API that is configured for execution by the management device 206 to retrieve the firmware operation results collected by the BMC engine 316*a* (e.g., by downloading any diagnostic/debug logs generated by the diagnostic tool(s)).

Thus, systems and methods have been described that provide for the provisioning of an SDK plugin (e.g., a new SDK plugin, an SDK plugin update, etc.) on a BMC device when firmware (e.g., new firmware, a firmware update, etc.) is provided on a computing component. For example, the BMC SDK plugin provisioning system may include a chassis housing a computing component and a BMC device that is coupled to the computing component. The BMC device identifies firmware that will be utilized by the computing component, and determines that a Software Development Kit (SDK) plugin, which is not currently configured for use by the BMC device, is required to interact with the firmware. In response, the BMC device accesses the SDK plugin, configures the SDK plugin for use by the BMC device, and uses the SDK plugin to interact with the firmware. As such, a BMC device in a computing device may be configured to interact with firmware provided for computing components in that computing device subsequent to the provisioning of that BMC device and those computing components in that computing device, and subsequent to the provisioning of that computing device to a user, allowing on-demand injection of diagnostic tool(s) into computing components via a BMC device, and subsequent interaction with those diagnostic tool(s) by the BMC device to trigger diagnostic operations on the computing component, collect diagnostic results, and provide those diagnostic results to a management device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Baseboard Management Controller (BMC) Software Development Kit (SDK) plugin provisioning system, comprising:

a chassis;

a primary processing system that is housed in the chassis and that is configured to provide an operating system that is configured to provide operating system functionality;

a computing component that is housed in the chassis; and a Baseboard Management Controller (BMC) device that is housed in the chassis, that includes a BMC processing system that is separate from the primary processing system, that is coupled to the computing component, and that is configured to provide BMC management functionality that is separate from the operating system functionality and to:

receive, from a management device, firmware for the computing component after the chassis, the computing component, and the BMC device have been provided to a user, wherein the firmware is configured to provide at least one diagnostic tool for the computing component;

provide the firmware on the computing component and, without requiring user input after the firmware is ready for execution on the computing component:

determine the BMC device is not currently configured to interact with the at least one diagnostic tool;

transmit, to the management device in response to determining that the BMC device is not currently configured to interact with the at least one diagnostic tool, a Software Development Kit (SDK) plugin request that requests an SDK plugin that is configured to enable the BMC device to interact with the at least one diagnostic tool;

receive, from the management device, the SDK plugin; and configure the SDK plugin for use by the BMC device to interact with the at least one diagnostic tool;

initiate, using the SDK plugin while the computing component is executing the firmware, the at least one diagnostic tool provided by the firmware on the computing component;

retrieve, using the SDK plugin and from the at least one diagnostic tool while the computing component is executing the firmware, diagnostic information for the computing component that is generated by the at least one diagnostic tool; and provide, to the management device, access to the diagnostic information.

2. The system of claim 1, wherein the receiving the SDK plugin from the management device includes:

receiving, from the management device, SDK plugin access information for the SDK plugin; and retrieving the SDK plugin using the SDK plugin access information.

3. The system of claim 1, wherein the configuring the SDK plugin for use by the BMC device includes:

configuring a firmware initiation process for initiating the at least one diagnostic tool and a firmware interaction process for interacting with the at least one diagnostic tool following initiation of the at least one diagnostic tool.

4. The system of claim 1, wherein the BMC device is configured to:

poll, using the SDK plugin while the computing component is executing the firmware, progress of the at least one diagnostic tool following initiation of the at least one diagnostic tool.

5. The system of claim 1, wherein the retrieving the diagnostic information includes:

collecting diagnostic results generated by the at least one diagnostic tool via at least one of a serial communication channel, a Non-Volatile Memory express Management Interface (NVMe-MI) device log, or a Compute eXpress Link Component Command Interface (CXL-CCI) device log.

6. The system of claim 1, wherein the firmware provided on the computing component is updated firmware, the SDK plugin is an SDK plugin update, and the configuring the SDK plugin update for use by the BMC device updates an existing SDK plugin that was configured for use by the BMC device and that did not allow the BMC device to interact with the updated firmware.

7. An Information Handling System (IHS), comprising:
- a Baseboard Management Controller (BMC) processing system; and
- a BMC memory system that is coupled to the BMC processing system and that includes instructions that, when executed by the BMC processing system, cause the BMC processing system to provide a BMC engine that is configured to provide BMC management functionality that is separate from operating system functionality provided by an operating system and to:
  - receive, from a management device, firmware for a computing component that is included in the IHS after the IHS, the computing component, and the BMC device have been provided to a user, wherein the firmware is configured to provide at least one diagnostic tool for the computing component;
  - provide the firmware on a computing component that is coupled to the processing system and, without requiring user input after the firmware is ready for execution on the computing component:
    - determine the BMC device is not currently configured to interact with the at least one diagnostic tool;
    - transmit, to the management device in response to determining that the BMC device is not currently configured to interact with the at least one diagnostic tool, a Software Development Kit (SDK) plugin request that requests an SDK plugin that is configured to enable the BMC device to interact with the at least one diagnostic tool;
    - receive, from the management device, the SDK plugin; and
    - configure the SDK plugin for use by the BMC engine to interact with the at least one diagnostic tool;
  - initiate, using the SDK plugin while the computing component is executing the firmware, the at least one diagnostic tool provided by the firmware on the computing component;
  - retrieve, using the SDK plugin and from the at least one diagnostic tool while the computing component is executing the firmware, diagnostic information for the computing component that is generated by the at least one diagnostic tool; and
  - provide, to the management device, access to the diagnostic information.

8. The IHS of claim 7, wherein the receiving the SDK plugin from the management device includes:
- receiving, from the management device, SDK plugin access information for the SDK plugin; and
- retrieving the SDK plugin using the SDK plugin access information.

9. The IHS of claim 7, wherein the configuring the SDK plugin for use by the BMC device includes:
- configuring a firmware initiation process for initiating the at least one diagnostic tool and a firmware interaction process for interacting with the at least one diagnostic tool following initiation of the at least one diagnostic tool.

10. The IHS of claim 7, wherein the BMC engine is configured to:
- poll, using the SDK plugin while the computing component is executing the firmware, progress of the at least one diagnostic tool following initiation of the at least one diagnostic tool.

11. The IHS of claim 7, wherein the retrieving the diagnostic information includes:
- collecting diagnostic results generated by the at least one diagnostic tool via at least one of a serial communication channel, a Non-Volatile Memory express Management Interface (NVMe-MI) device log, or a Compute eXpress Link Component Command Interface (CXL-CCI) device log.

12. The IHS of claim 7, wherein the firmware provided on the computing component is updated firmware, the SDK plugin is an SDK plugin update, and the configuring the SDK plugin update for use by the BMC engine updates an existing SDK plugin that was configured for use by the BMC engine and that did not allow the BMC engine to interact with the updated firmware.

13. The IHS of claim 7, further comprising:
- a primary processing system that is coupled to the BMC processing system; and
- a primary memory system that is coupled to the primary processing system and that includes instructions that, when executed by the primary processing system, cause the primary processing system to provide an operating system engine that is configured to provide the operating system.

14. A method for providing a Software Development Kit (SDK) plugin in a Baseboard Management Controller (BMC) device, comprising:
- receiving, by a Baseboard Management Controller (BMC) device in a computing device from a management device, firmware for a computing component that is included in the computing device after the computing device, the computing component, and the BMC device have been provided to a user, wherein the firmware is configured to provide at least one diagnostic tool for the computing component;
- providing, by the BMC device, the firmware on the computing component and, without requiring user input after the firmware is ready for execution on the computing component:
  - determining, by the BMC device, the BMC device is not currently configured to interact with the at least one diagnostic tool;
  - transmitting, by the BMC device to the management device in response to determining that the BMC device is not currently configured to interact with the at least one diagnostic tool, a Software Development Kit (SDK) plugin request that requests an SDK plugin that is configured to enable the BMC device to interact with the at least one diagnostic tool;
  - receiving, by the BMC device from the management device, the SDK plugin; and
  - configuring, by the BMC device, the SDK plugin for use by the BMC device to interact with the at least one diagnostic tool;
- initiating, by the BMC device using the SDK plugin while the computing component is executing the firmware, the at least one diagnostic tool provided by the firmware on the computing component;
- retrieving, by the BMC device using the SDK plugin and from the at least one diagnostic tool while the computing component is executing the firmware, diagnostic information for the computing component that is generated by the at least one diagnostic tool; and providing, by the BMC device to the management device, access to the diagnostic information.

15. The method of claim 14, wherein the receiving the SDK plugin from the management device includes:

receiving, from the management device, SDK plugin access information for the SDK plugin; and retrieving the SDK plugin using the SDK plugin access information.

16. The method of claim 14, wherein the configuring the SDK plugin for use by the BMC device includes:

configuring a firmware initiation process for initiating the at least one diagnostic tool and a firmware interaction process for interacting with the at least one diagnostic tool following initiation of the at least one diagnostic tool.

17. The method of claim 14, further comprising:

polling, by the BMC device using the SDK plugin while the computing component is executing the firmware, progress of the at least one diagnostic tool following initiation of the at least one diagnostic tool.

18. The method of claim 14, wherein the retrieving the diagnostic information includes:

collecting diagnostic results generated by the at least one diagnostic tool via at least one of a serial communication channel, a Non-Volatile Memory express Management Interface (NVMe-MI) device log, or a Compute eXpress Link Component Command Interface (CXL-CCI) device log.

19. The method of claim 14, wherein the firmware provided on the computing component is updated firmware, the SDK plugin is an SDK plugin update, and the configuring the SDK plugin update for use by the BMC device updates an existing SDK plugin that was configured for use by the BMC device and that did not allow the BMC device to interact with the updated firmware.

20. The method of claim 14, wherein the computing device is a server device including a server chassis that houses the BMC device and the computing component.

* * * * *